United States Patent
Bataller et al.

(10) Patent No.: US 10,021,513 B2
(45) Date of Patent: Jul. 10, 2018

(54) VISUAL RECOGNITION OF TARGET DEVICES

(71) Applicant: Apple Inc., Cupertino, CA (US)

(72) Inventors: Ignacio P Mellado Bataller, Sunnyvale, CA (US); Ryan S. Dixon, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/087,227

(22) Filed: Mar. 31, 2016

(65) Prior Publication Data

US 2017/0289737 A1 Oct. 5, 2017

(51) Int. Cl.
| | |
|---|---|
| *G06F 17/24* | (2006.01) |
| *G06F 3/0482* | (2013.01) |
| *G06F 3/0484* | (2013.01) |
| *H04W 4/00* | (2018.01) |
| *H04L 29/08* | (2006.01) |
| *H04W 4/80* | (2018.01) |
| *H04W 84/12* | (2009.01) |

(52) U.S. Cl.
CPC ............. *H04W 4/008* (2013.01); *H04L 67/06* (2013.01); *H04W 4/80* (2018.02); *H04W 84/12* (2013.01)

(58) Field of Classification Search
CPC ..... H04W 4/008; H04W 4/026; H04W 4/023; H04W 12/08; G06G 3/0482; G06F 3/0484; G06F 17/24; H04L 67/06; H04L 67/38; H04L 67/18; H04L 67/141; H04L 67/14; H04L 63/18
See application file for complete search history.

(56) References Cited

U.S. PATENT DOCUMENTS

| | | | |
|---|---|---|---|
| 8,230,075 B1 * | 7/2012 | Weskamp | H04W 4/023 709/203 |
| 8,312,392 B2 | 11/2012 | Forutanpour et al. | |
| 9,042,906 B1 | 5/2015 | Sushkov et al. | |
| 2005/0071295 A1 * | 3/2005 | Cordery | G06Q 20/105 705/405 |
| 2005/0254714 A1 | 11/2005 | Anne | |
| 2011/0154014 A1 | 6/2011 | Thorn | |
| 2011/0299857 A1 | 12/2011 | Rekimoto | |
| 2012/0061458 A1 * | 3/2012 | Bahr | G06K 7/10792 235/375 |
| 2013/0125224 A1 * | 5/2013 | Kaufman | H04L 63/18 726/7 |

(Continued)

OTHER PUBLICATIONS

Lenovo, SHAREit, Mar. 19, 2016 https://web.archive.org/web/20160319114622/http://shareit.lenovo.com/.*

(Continued)

*Primary Examiner* — James Yang
(74) *Attorney, Agent, or Firm* — Fish & Richardson P.C.

(57) ABSTRACT

An example method includes presenting, on a first display screen associated with a first computing device, a first graphically encoded display element. The method also includes acquiring, using an image acquisition component associated with a second computing device, one or more images of the first display screen, determining that the one or more images correspond to the first display element, and responsive to determining that the one or more images correspond to the first display element, transferring a data item from the second computing device to the first computing device.

47 Claims, 19 Drawing Sheets

(56) References Cited

U.S. PATENT DOCUMENTS

2015/0042819 A1    2/2015  Tiscareno et al.
2015/0199084 A1*   7/2015  Velusamy ........... G06F 3/04842
                                                        715/716

OTHER PUBLICATIONS iPhone-Tricks, Control Apple TV with iPhone App, 2015 https:/lweb.archive.org/web/20151 104052939/http:l/i phone-tricks.com/tutori al/1 104-control-apple-tv-with-iphore-remote-app.*
How to use Shareit on Pc, YouTube, Mar. 28, 2016 https://www.youtube.com/watch?v=BIGJ8AxGrEw.*
Multiple monitors windows 7, Fitzpatrick, 2010 https://www.lifehacker.com.au/2010/04/make-the-most-of-your-multiple-monitors-in-windows-7/.*

* cited by examiner

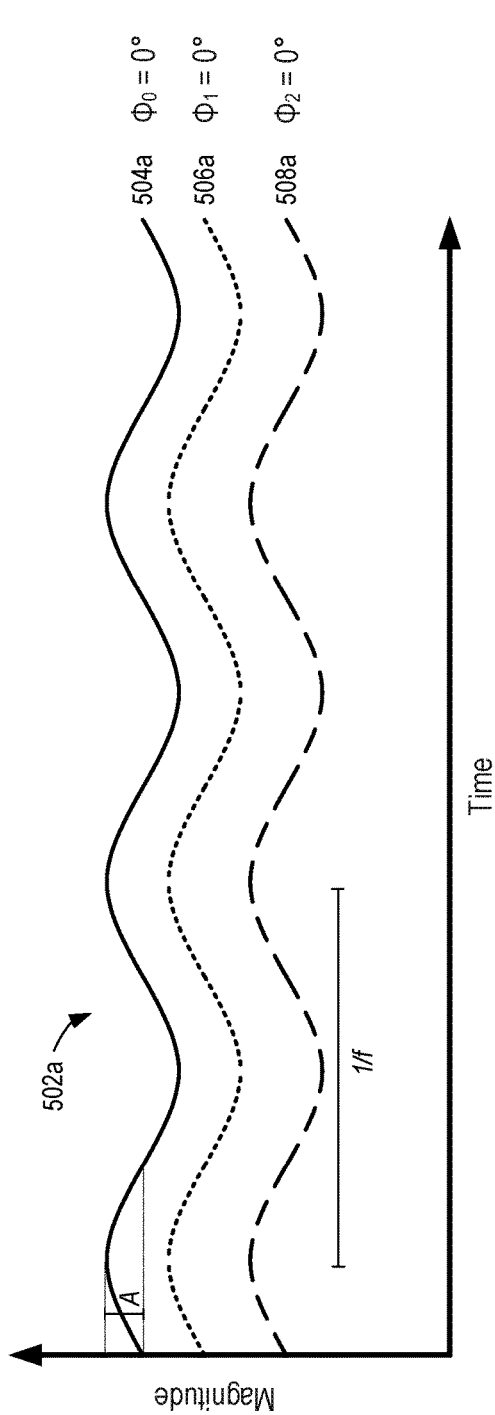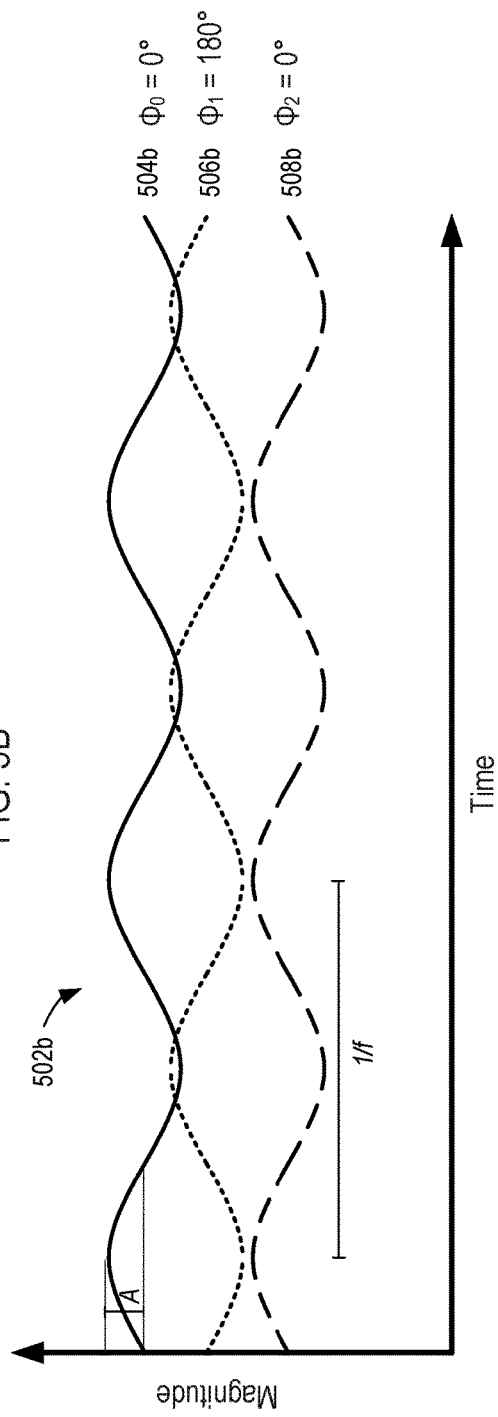
FIG. 5B
FIG. 5C

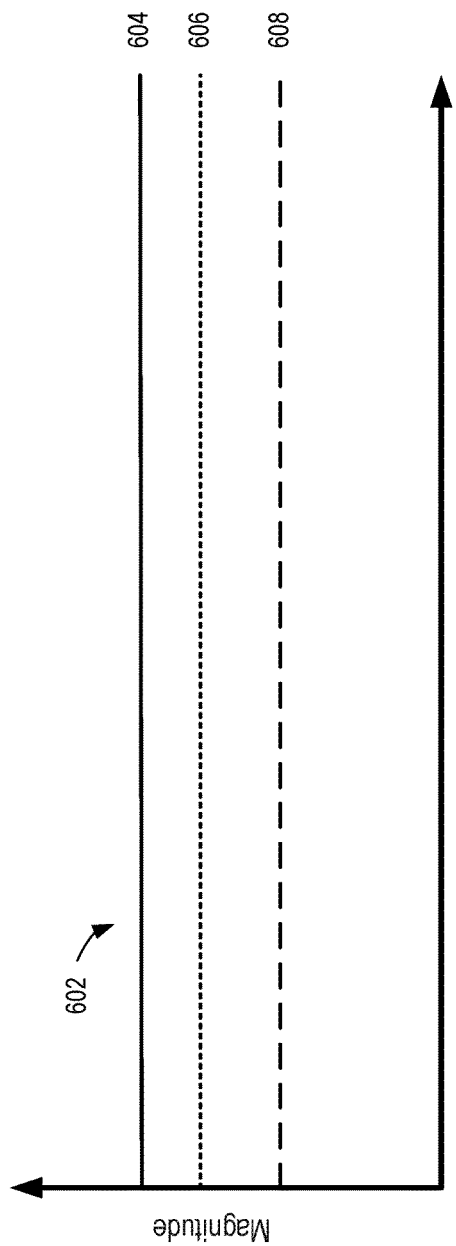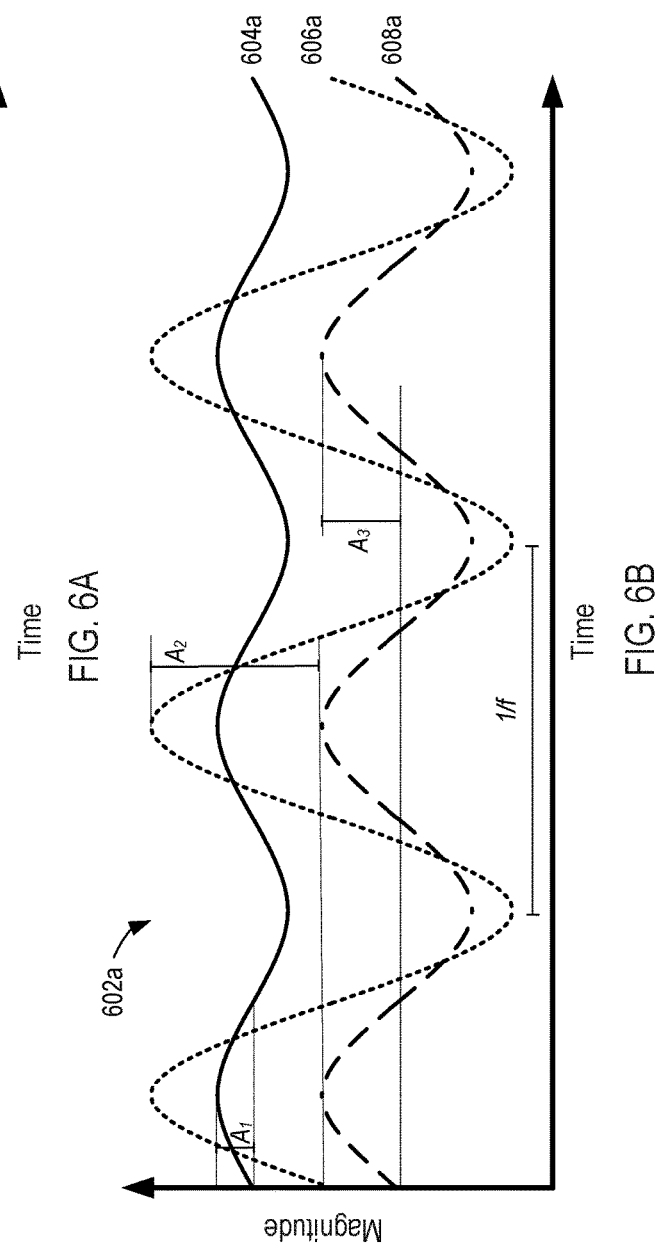

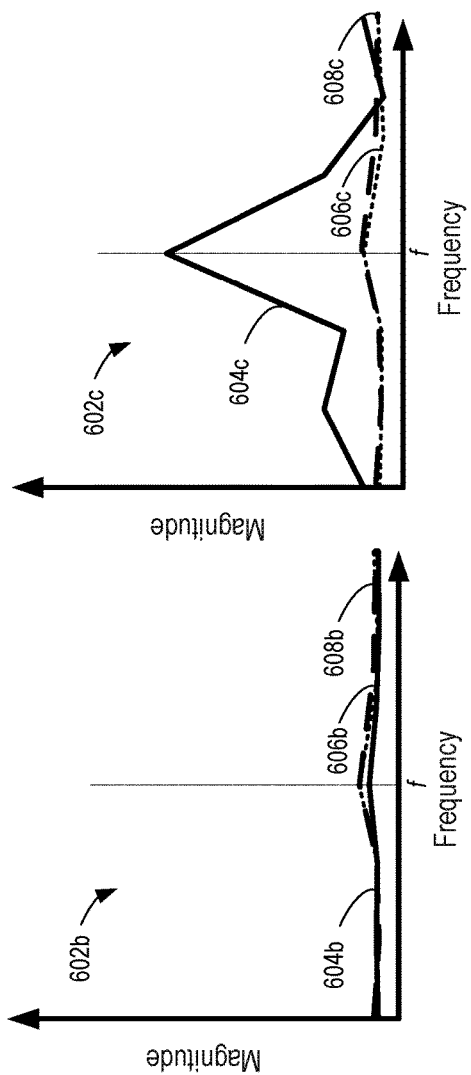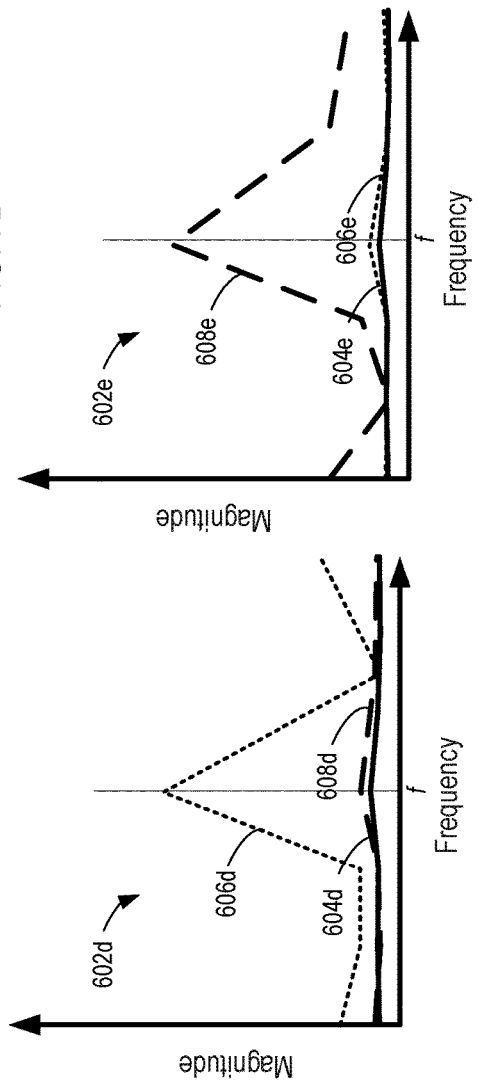

VISUAL RECOGNITION OF TARGET DEVICES

TECHNICAL FIELD

The disclosure relates generally to transferring data between computing devices.

BACKGROUND

In general, data stored on a computing device can be transferred to another computing device, such that the data is shared between them. This can be useful, for example, if a user has stored information on one of his devices, but wishes to access that information on another one of his devices. In some cases, the user can initiate a data transfer by selecting one or more data objects (e.g., documents, images, movies, music, and/or files) on a source device, and identifying a destination device to which the data objects should be transferred.

SUMMARY

Systems, methods, devices and non-transitory, computer-readable mediums are disclosed for transferring data between computing devices.

In general, in an aspect, a method includes presenting, on a first display screen associated with a first computing device, a first graphically encoded display element. The method also includes acquiring, using an image acquisition component associated with a second computing device, one or more images of the first display screen, and determining that the one or more images correspond to the first display element. The method also includes responsive to determining that the one or more images correspond to the first display element, transferring a data item from the second computing device to the first computing device.

Implementations can include one or more of the following features.

In some implementations, the method can further include determining, based on the one or more images, that the first display element corresponds to a graphical user interface (GUI) of an application presented on the first display screen, and responsive to determining that the first display element corresponds to the GUI of the application, updating the GUI of the application to include a representation of the data item.

In some implementations, the method can further include determining, based on the one or more images, that the first display element corresponds to a document presented on the first display screen, and responsive to determining that the first display element corresponds to the document, inserting the data item into the document.

In some implementations, the method can further include presenting, on a second display screen associated with a third computing device, a second graphically encoded display element different than the first display element. Determining that the one or more images correspond to the first display element can include distinguishing the first display element from the second display element.

In some implementations, the method can further include receiving, at the second computing device, an indication from a user to share the data item. The first display element and the second display element are each presented in response to receiving the indication from the user to share the data item.

In some implementations, the first display element can include a first identifier encoded in one or more color channels of the first display element, and wherein the second display element comprises a second identifier encoded in one or more color channels of the second display element. The one or more color channels of the first display element can include a first sinusoidal signal and the one or more color channels of the second display element comprises a second sinusoidal signal. The one or more color channels of the first display element and the one or more color channels of the second display element, when viewed by an unaided human eye, may not appear to vary according to time.

The first identifier can be phase-encoded in two or more color channels of the first display element. The first identifier can be encoded by varying a phase of one color channel of the first display element with respect to another color channel of the first display element. The first identifier is encoded in three or more color channels of the first display element, and wherein the first identifier is encoded by varying phases of two color channels of the first display element with respect to another color channel of the first display element.

The color channels of the first display element can include a carrier channel, a first signal channel, and a second signal channel, each having a same frequency, and the first identifier can be phase-encoded by varying the phases of the first signal channel and the second signal channel with respect to the carrier channel. The carrier channel, the first signal channel, and the second signal channel can be each in a group consisting of a green color channel, a blue color channel, and a red color channel.

In some implementations, transferring the data item from the second computing device to the first computing device can include transferring the data item over a wireless connection. The wireless connection can be a Bluetooth connection or a Wi-Fi connection.

Other implementations are directed to systems, devices and non-transitory, computer-readable mediums.

Particular implementations provide at least the following advantages. In some implementations, a user can quickly and intuitively transfer files from one computing device to another using a physical gesture (e.g., pointing one device at another), without requiring that the user manually select the desired destination device from among a list of available devices (e.g., by manually typing, tapping, or otherwise selecting from among a list of available devices on the user interface). Further, some implementations allow a user to transfer files to a destination device even if he does not know the identification information of the destination device (e.g., a computer name, a network address, or other identifier associated with the destination device). Thus, the user can transfer data more easily, and without the extra burden of remembering identification information for each of several different devices.

Details of one or more implementations are set forth in the accompanying drawings and the description below. Other features, aspects, and potential advantages will be apparent from the description and drawings, and from the claims.

DESCRIPTION OF DRAWINGS

FIGS. 5A-E are graphs showing the color channels of example display elements over time.

FIGS. 6A and 6B are graphs showing the color channels of example display elements over time.

FIGS. 7A-G are graphs showing the color channels of example display elements in the frequency domain.

DESCRIPTION

Overview

Figure 1:
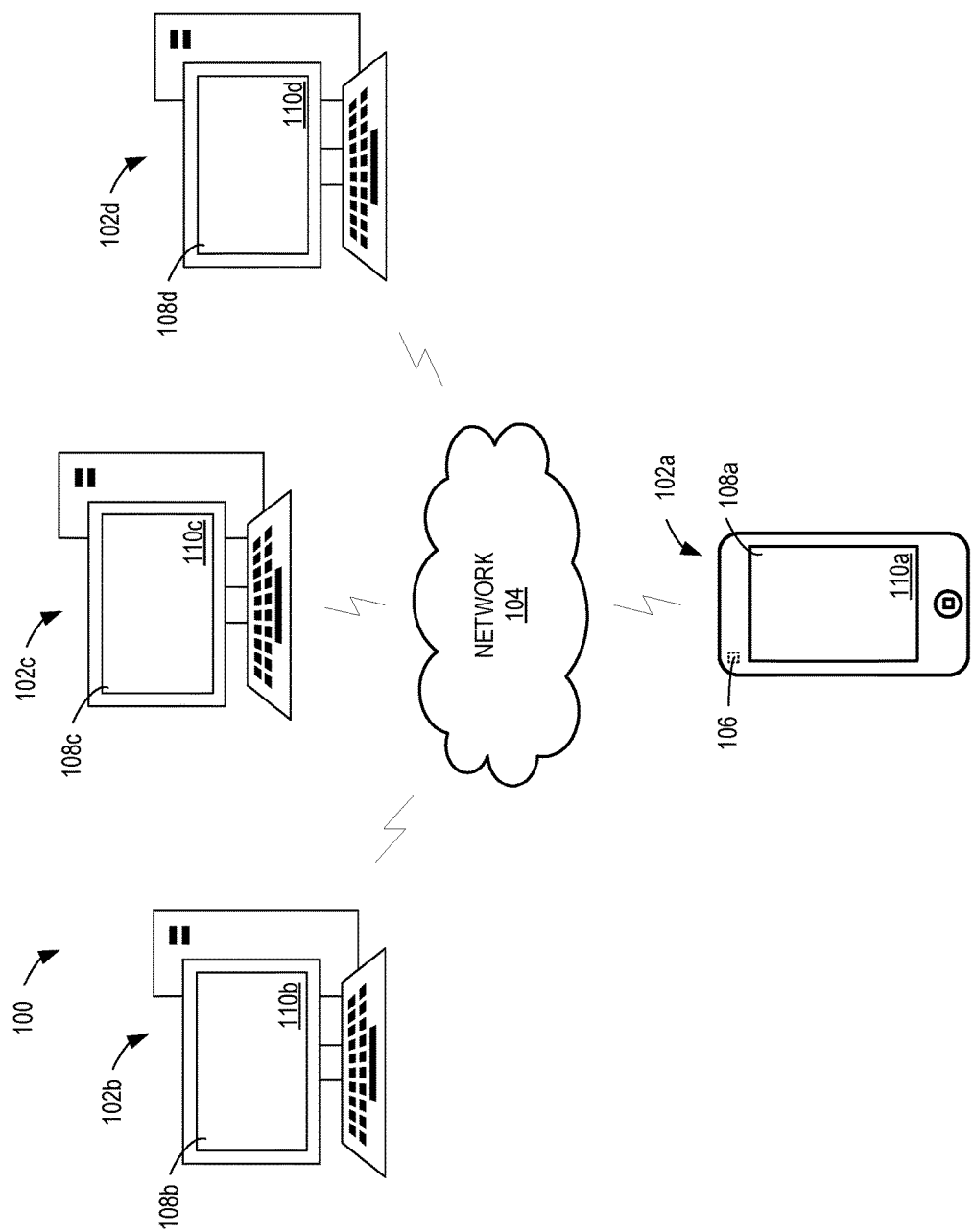
FIG. 1 is a block diagram of an example system for transferring data between computing devices.

FIG. 1 is a block diagram of an example system 100 for transferring data between computing devices. In some cases, a user can use the system 100 to transfer data from one computing device to another using a physical gesture (e.g., pointing one device at another), without requiring that the user manually select a desired destination device from among a list of available devices.

The system 100 includes a mobile computing device 102a, several other computing devices 102b-d, and a network 104.

The mobile computing device 102a can be any portable electronic device that is used by a user to view, process, transmit and receive data. Examples of a mobile computing device 102a include cellular phones, smartphones, wearable devices (e.g., smart watches), tablets, personal data assistants, notebook computers, and other portable computing devices capable of transmitting and receiving data via the network 104. The mobile computing device 102a can include devices that operate using one or more operating systems (e.g., Apple iOS, Apple OSX, Apple watchOS, Linux, Unix, Android, Microsoft Windows, etc.) and/or architectures (e.g., ARM, PowerPC, x86, etc.)

The mobile computing device 102a includes an imaging component 106 for acquiring digital images of the surrounding environment. Digital images can include, for example, one or more static images (e.g., photographs), or one or more sequences of images (e.g., frames in a video or movie). Various types of imaging components can be used. For example, the imaging component 106 can include an electronic sensor that captures light and converts it into electrical signals, such as a semiconductor charge-coupled device (CCD) image sensor. In some cases, the imaging component 106 can include a camera subsystem and/or an optical sensor in a computing device (e.g., a mobile computing device, such as a cellular phone, smartphone, wearable device, tablet, personal data assistant, notebook computer, and other portable computing device).

The computing devices 102b-d can be any electronic device that is used by a user to view, process, transmit and receive data. The computing devices 102b-d can be portable or non-portable devices. Examples of computing devices 102b-d include computers (such as desktop computers, notebook computers, server systems, etc.), mobile computing devices, and other computing devices capable of transmitting and receiving data via network 104. Likewise, computing devices 102b-d can include devices that operate using one or more operating systems (e.g., Apple iOS, Apple OSX, Apple watchOS, Linux, Unix, Android, Microsoft Windows, etc.) and/or architectures (e.g., x86, PowerPC, ARM, etc.)

Each computing device 102a-d includes a display device 108a-d for visually presenting information to a user. For instance, each display device 108a-d can display a user interface 110a-d to the user, and users can interact with user interfaces 110a-d to view data, transmit data to other devices, and issue commands. Example display devices include monitors or display panels, such as LCD (liquid crystal display) or LED (light emitting diode) devices. In some cases, the display devices 108a-d can also act as input devices (e.g., touch sensitive display devices) such that users can interact with the user interfaces 110a-d by touching and/or performing gestures on the display devices.

The network 104 can be any communications network through which data can be transferred and shared. For example, the network 104 can be a local area network (LAN) or a wide-area network (WAN), such as the Internet. The network 104 can be implemented using various networking interfaces, for instance wireless networking interfaces (such as Wi-Fi, Bluetooth, or infrared) or wired networking interfaces (such as Ethernet or serial connections). The network 104 also can include combinations of more than one network, and can be implemented using one or more networking interfaces.

The system 100 can be used to transmit data objects (e.g., documents, text, images, movies, music, and/or files) between the computing devices 102a-d. For example, a data object stored on the computing device 102a can be transmitted to the computing device 102b, such that the data object can be accessed on both the computing devices 102 and 102b. In some cases, a user can conduct this transfer by selecting the data object that he wishes to share on the computing device 102a, and pointing the imaging component 106 of the computing device 102a in the direction of the computing device 102b, such that the imaging component 106 acquires one or more images of the computing device 102b. Based on the acquired images, the computing device 102a identifies the computing device 102b as the desired destination for the data transfer, and transfers the selected data object to the computing device 102b.

This can beneficial, for example, as it allows a user to quickly and intuitively transfer files from one computing device to another using a physical gesture (e.g., pointing one device at another), without requiring that the user manually select the desired destination device from among a list of available devices (e.g., by manually typing, tapping, or otherwise selecting from among a list of available devices on the user interface 110a). Further, this can be beneficial, as it allows the user to transfer files to a destination device even if he does not know the identification information of the destination device (e.g., a computer name, a network address, or other identifier associated with the destination device). Thus, the user can transfer data more easily, and without the extra burden of remembering identification information for each of several different devices.

Figure 2A:
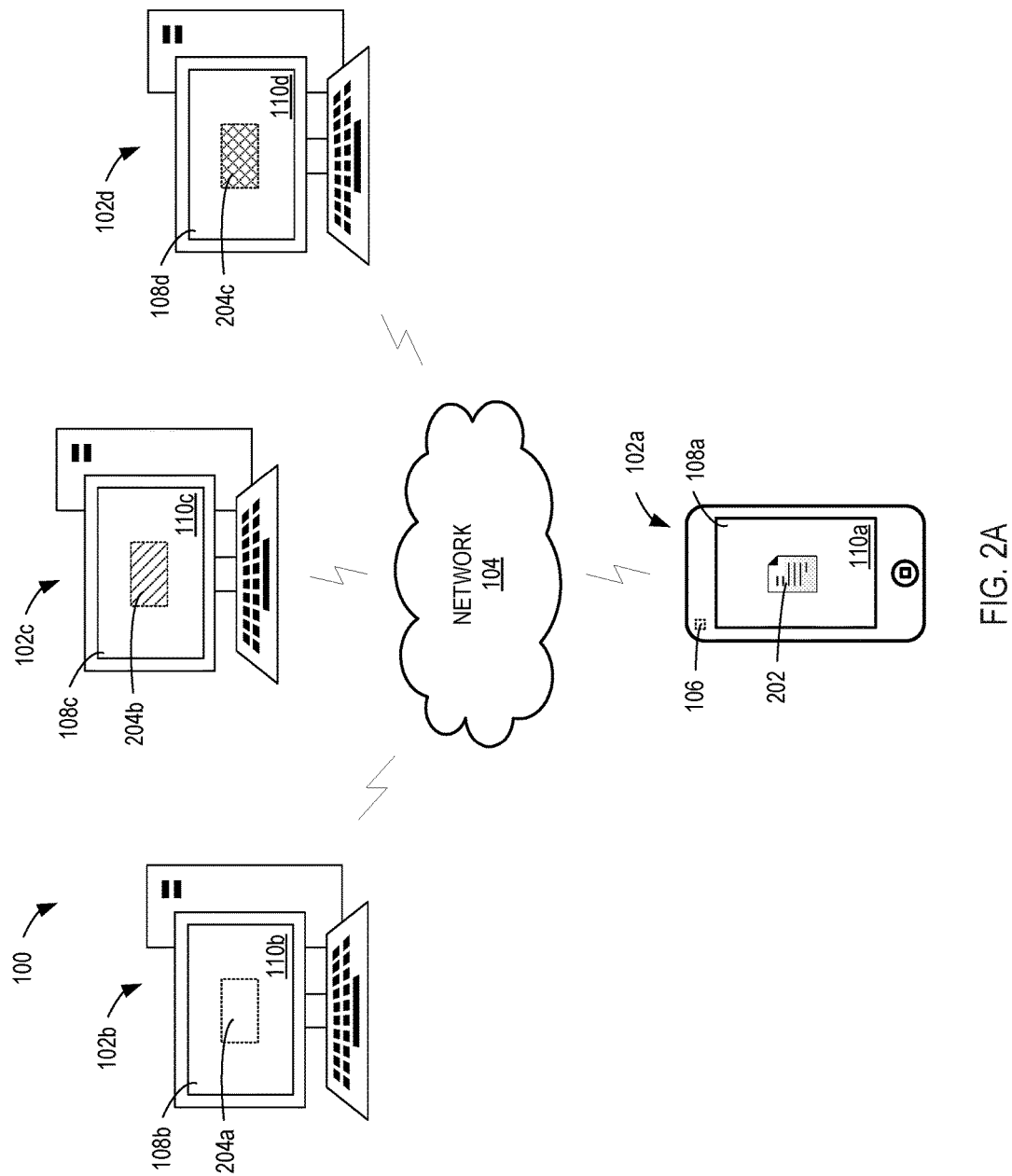
FIGS. 2A-C are block diagrams showing an example process for transferring data between computing devices.
Figure 2B:
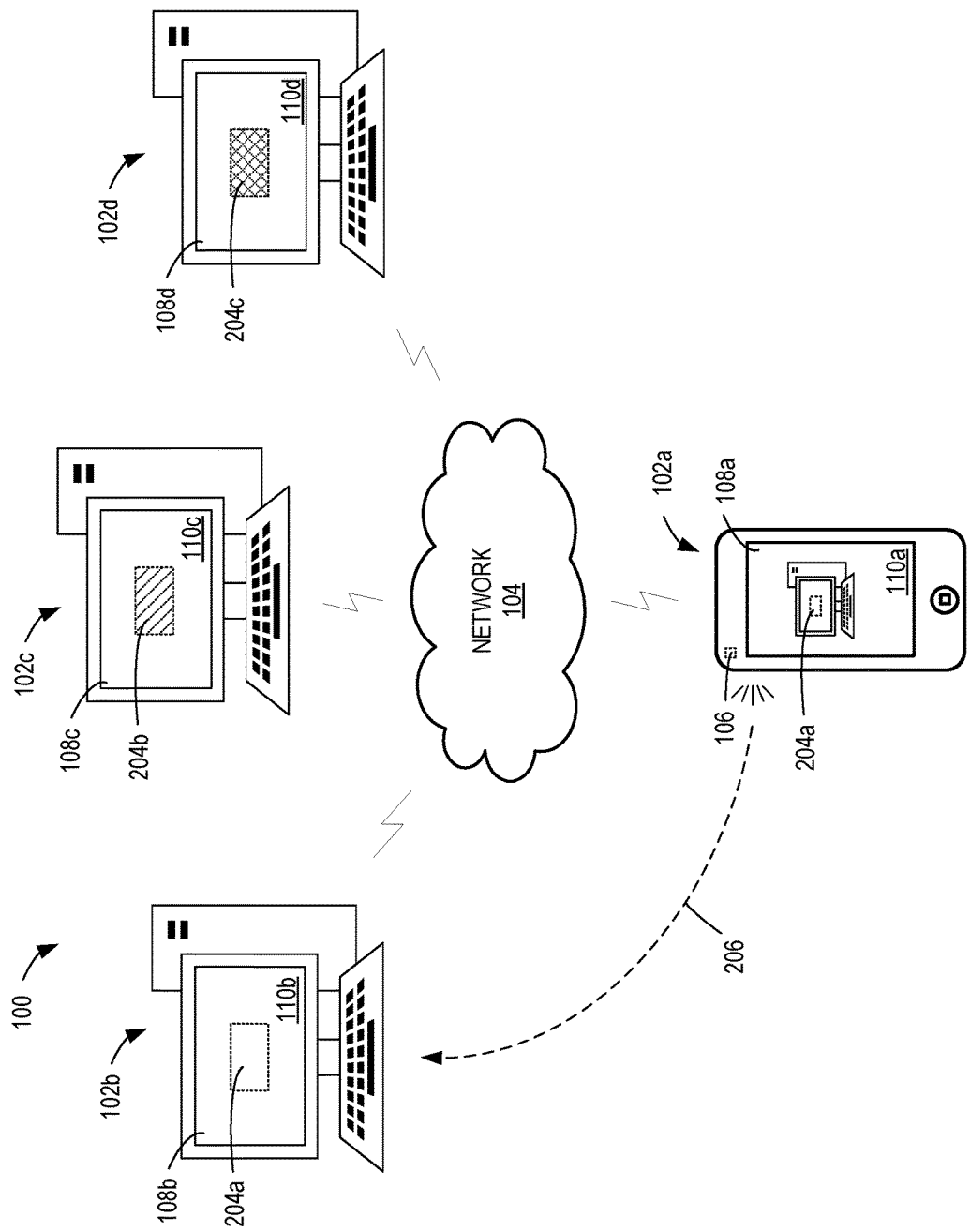
Figure 2C:
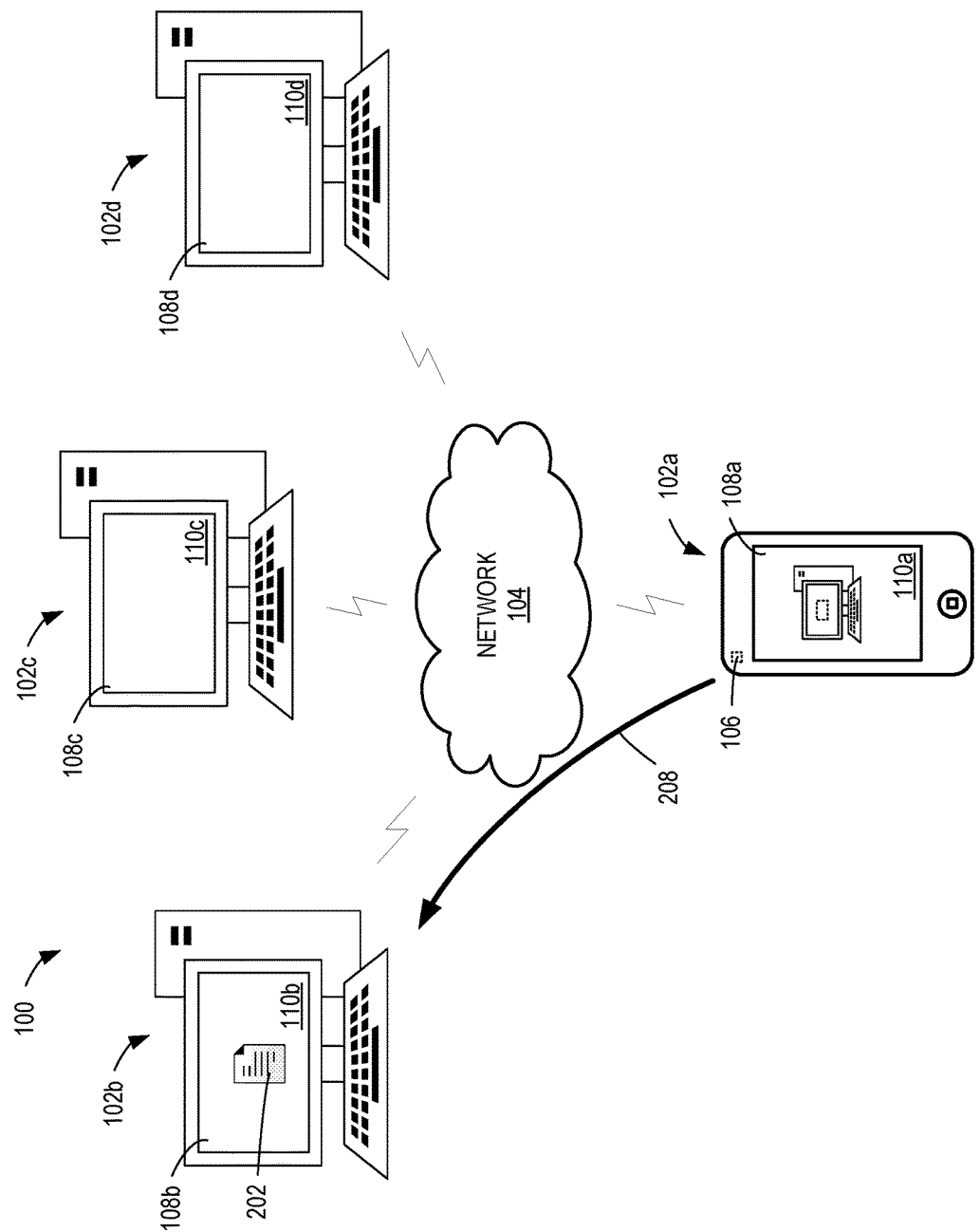

An example process of transferring a data object between computing devices is shown in FIGS. 2A-C.

As shown in FIG. 2A, a user can initiate a data transfer by selecting a data object 202 that he wishes to share on the computing device 102a (e.g., by selecting a visual representation of the data object 202, such as an icon or list item, on the user interface 110a), and inputting a command to share the selected data object 202 (e.g., by selecting a "share" or "transfer" command on the user interface 110a). In response, the computing device 102a transmits, to each of the other computing devices 102b-d, an indication that the user would like to transfer data. This indication can be, for example, one or more data packets or messages transmitted from the computing device 102 to the computing devices 102b-d over the network 104, indicating that a data transmission is to occur.

Upon receiving an indication that the user would like to transfer data, each computing device 102b-d displays a respective graphically encoded display element 204a-c on its respective display device 108b-d. Each display element 204a-c is graphically unique with respect to the other display elements, and uniquely corresponds to a particular one of the computing devices 102b-d. Thus, the display elements 204a-c can be used by the computing device 102a as a graphical identifier to distinguish the computing devices 102b-d from one another.

The display elements 204a-c can be presented in various ways. For example, one or more portions of the user interface 110b-d (e.g., icons, backgrounds, images, text, and/or other graphical elements) can be updated to include the display elements 204a-c. In some cases, a display element can be displayed across an entirety (or substantially the entirety) of a user interface; as an example, a display element can be presented by a display device such that it extends across the entirety (or substantially the entirety) of the visual output of the display device. In some cases, a display element can be presented on a portion of the user interface. In some cases, multiple display elements can be presented at once on a single user interface. For example, in some cases, multiple display elements can be arranged in a line, a grid, or any other arbitrary arrangement. In some cases, display elements can be arranged such that they are positioned within a particular application, window, pane, or other portions of the user interface.

In some cases, the display elements 204a-c can be static. For example, the display elements 204a-c can each have a particular color, shape, and/or other static graphical pattern, and different colors, shapes, and/or other graphical patterns can be used to distinguish the display elements from one another. In some cases, the display elements 204a-c can be dynamic, and its graphical properties can change over time. For example, each display elements 204a-c can include one or more color channels of information (e.g., red, green, and blue), and the intensity of one or more of these color channels can vary over time according to a particular dynamic pattern (e.g., a sinusoid, a sequence of pulses, or other dynamic pattern). Different dynamic patterns can be used to distinguish the display elements from one another.

In FIG. 2A, each of the display elements 204a-c are illustrated using different shading patterns. However, this is merely to illustrate that each of the display elements 204a-c are graphically distinct from one another. In some cases, even though the display elements 204a-c each differ graphically from one another, the display elements 204a-c can appear identical or substantially identical to a user (e.g., when viewed by an unaided human eye). For example, the graphical differences between each can be relatively small, such that they cannot be discerned by a user, but still sufficiently large, such that they can be detected by the computing device 102a. Further, some cases, even though the display elements 204a-c are displayed by computing devices 102b-d (e.g., presented by the display devices 108b-d), they can be displayed such that they are not visible to a user (e.g., when viewed by an unaided human eye), but such that they can still be detected by the computing device 102a. For example, the display elements 204a-c can be relatively small (e.g., represented as 1 pixel, 2 pixels, 3 pixels, and so forth) and/or incorporated into other graphical elements of a user interface (e.g., icons, backgrounds, images, text, and/or other graphical elements) such that they cannot be distinguished from by graphical element. This can be useful, for example, as the display elements can provide information regarding the identity of a computing device, while neither distracting the user, nor impairing the user's ability to see other information presented on the user interfaces 110b-d. Nevertheless, in some cases, some or all of the display elements can be visible to the user and/or appear distinct from each other with respect to the user (e.g., displayed as a visible and/or unique icon, image, pixel, group of groups, and so forth). Example techniques for encoding identifying information in the display elements are discussed in further detail below.

In this example, the user wishes to selectively transfer the data object 202 to the computing device 102b, while not transferring the object to the other computing devices 102c-d. As shown in FIG. 2B, the user can make this selection by pointing the imaging component 106 of the computing device 102a in the direction of the computing device 102b (indicated by dotted line 206), such that the imaging component 106 acquires one or more images of the computing device 102b. In particular, the one or more images of the computing device 102b include the display element 204a presented by the display device 108b. As the display element 204a is unique with respect to the other display elements 204b-c, based on the acquired images, the computing device 102a can identify the computing device 102b as the desired destination for the data transfer. As an example, the computing device 102a can identify the display element 204a in the images, and compare it to a list of known display elements and their corresponding computing devices; when a match is found, the computing device 102a can identify a particular one of the computing devices as the intended destination.

In some cases, this list can be generated beforehand. For instance, prior to selecting a data object to transfer, the user can perform a "set up" procedure in which he connects each of the computing devices 102b-d to the computing device 102a (e.g., a "pairing" process). Each of the computing devices 102b-d can be assigned a particular display element, and information about the assignment can be stored on each of the computing devices 102a-d. Based on this information, the computing devices 102b-d can display the appropriate display element when a data transfer is initiated, and the computing device 102a can identify an appropriate destination based on acquired images of one of the computing devices.

In some cases, this list can be generated during the data transfer process. For instance, the computing device 102a can transmit, to each of the devices to the network 104 (including the computing devices 102b-d), an indication that the user would like to transfer data. If the devices on the network 104 are capable of receiving data, in response, they can send an indication that they are available to receive data. Based on this information, the computing device 102a can assign a particular display element to each device that responds (e.g., the computing devices 102b-d), and information about the assignment can be stored on each of the computing devices (e.g., the computing devices 102a-d). Based on this information, the computing devices 102b-d can display the appropriate display element, and the computing device 102a can identify an appropriate destination based on acquired images of one of the computing devices.

As shown in FIG. 2C, after identifying the computing device 102b, the computing device 102a transfers the selected data object 202 to the computing device 102b through the network 104 (indicated by line 208). As a result of the transfer, the data object 202 is accessible to both the computing devices 102a and 102b.

In the example shown in FIGS. 2A-C, a user can generally transfer data from a first computing device to a second computing device by pointing the imaging component of the first computing device in the direction of the second computing device. In some implementations, however, the user can transfer data with a greater degree of specificity. For example, in some cases, the user can transfer data from a first computing device to a second computing device, such that the data is made available to a specific application running on the second computing device and/or inserted into a specific portion of the user interface presented by the second computing device. This can be performed in a generally similar manner as described with respect to FIGS. 2A-C. For example, a user can conduct a data transfer by selecting the data object that he wishes to share on a first computing device, and pointing the imaging component of the computing device in the direction of a second computing device, such that the imaging component of the first computing device acquires one or more images of a specific portion of the user interface and/or a specific application displayed by the second computing device. Each portion of the user interface contains a distinctive graphically encoded display element that identifies both a particular computing device and a specific portion and/or application of that computing device. Thus, based on the acquired images, the first computing device can identify the specific portion of the second computing device's user interface and/or the specific application running on the second computing device as the desired destination for the data transfer.

Figure 3A:
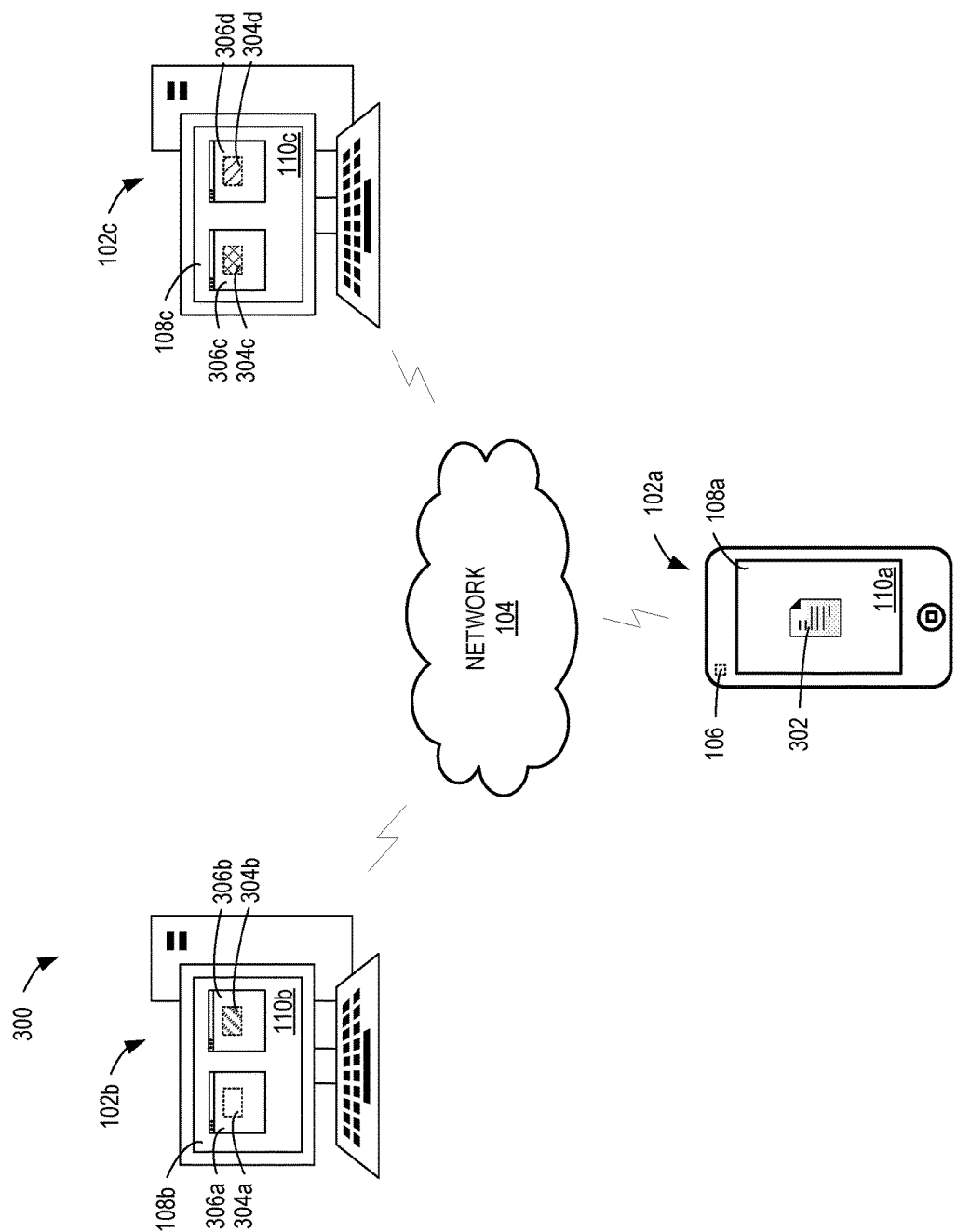
FIGS. 3A-C are block diagrams showing an example process for transferring data between computing devices.
Figure 3B:
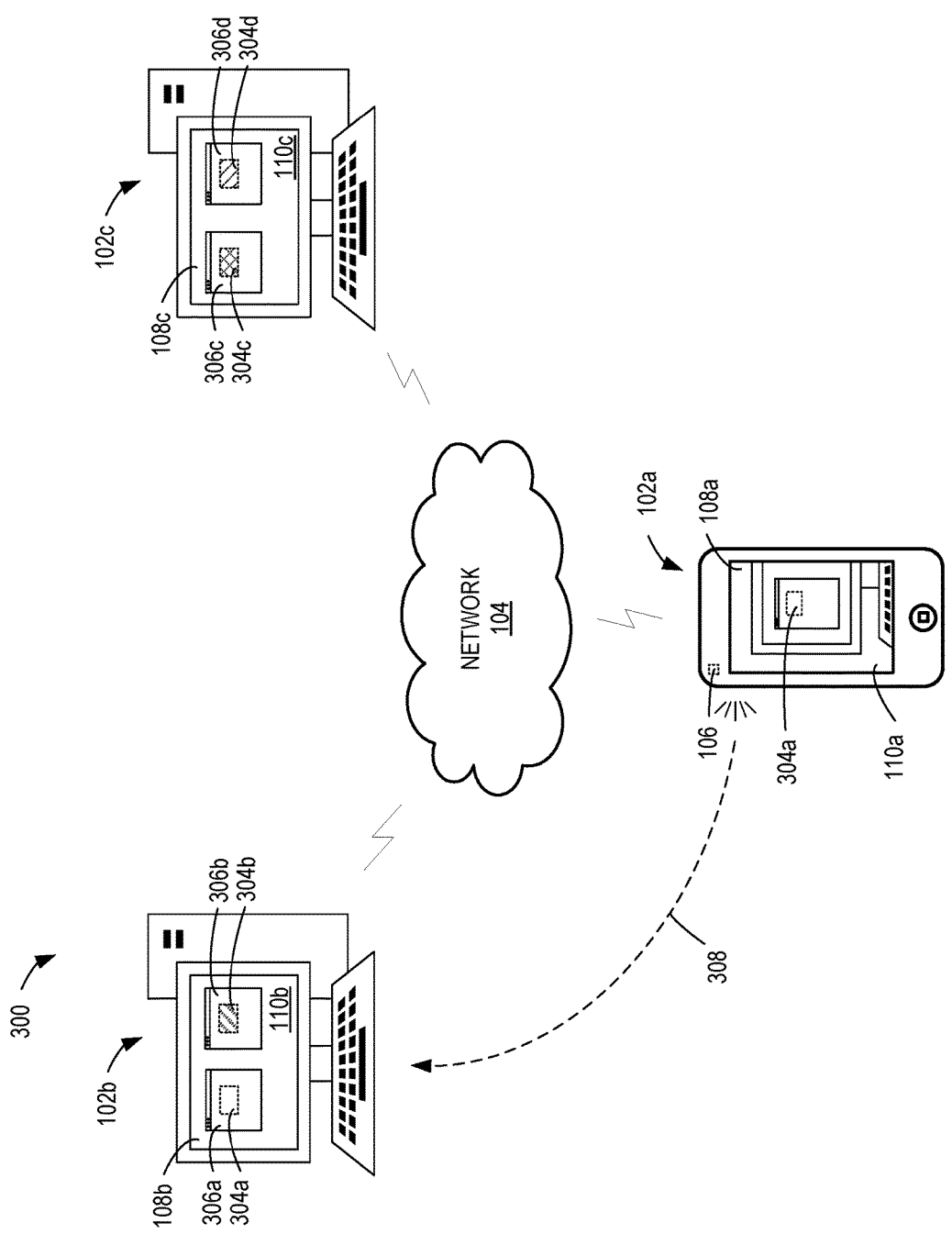
Figure 3C:
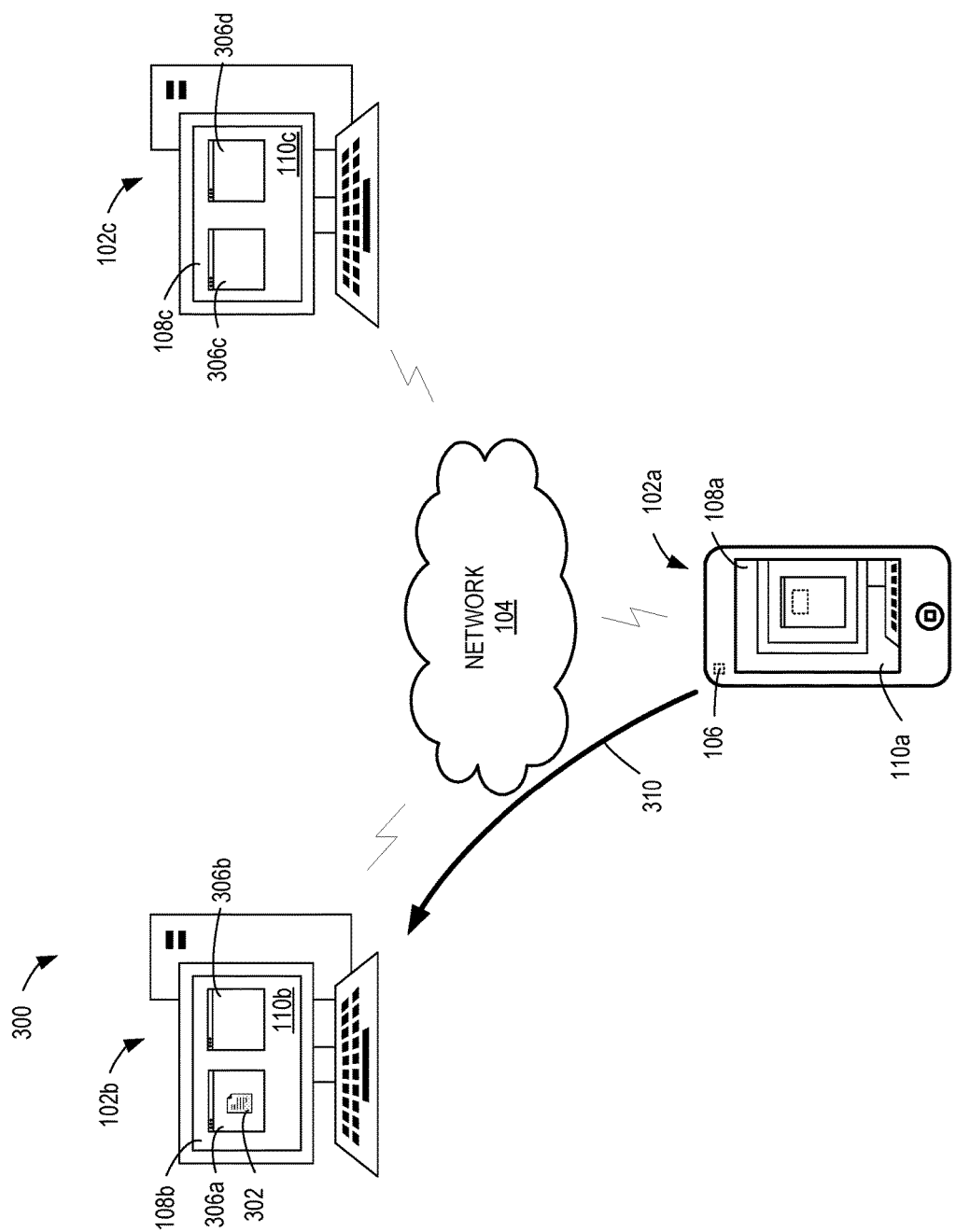

An example process of transferring a data object between computing devices in this manner is shown in FIGS. 3A-C.

FIG. 3A is a block diagram of an example system 300 for transferring data between computing devices. The system 300 includes a mobile computing device 102a, several other computing devices 102b-c, and a network 104. In general, the mobile computing device 102a, the computing devices 102b-c, and a network 104 can be similar to those described with respect to FIGS. 1 and 2A-C.

As shown in FIG. 3A, a user can initiate a data transfer using the computing device 102a by selecting a data object 302 that he wishes to share (e.g., by selecting a visual representation of the data object 302, such as an icon or list item, on the user interface 110a), and inputting a command to share the selected data object 302 (e.g., by selecting a "share" or "transfer" command on the user interface 110a). In response, the computing device 102a transmits, to each of the other computing devices 102b-c, an indication that the user would like to transfer data. This indication can be, for example, one or more data packets or messages transmitted from the computing device 102 to the computing devices 102b-c over the network 104, indicating that a data transmission is to occur.

Upon receiving an indication that the user would like to transfer data, the computing device 102b displays graphically encoded display elements 304a and 304b on its display device 108b, and the computing device 102c displays graphically encoded display elements 304c and 304d on its display device 108c. Each display element 304a-d is graphically unique with respect to the other display elements, and uniquely corresponds to a particular one of the computing devices 102b and 102c, as well as to a particular one of the applications 306a-d. Thus, the display elements 304a-d can be used by the computing device 102a as a graphical identifier to distinguish the computing devices 102b and 102c, as well as the particular applications and/or portions of the user interface from one another.

For example, as shown in FIG. 3A, the user interface 110b of the computing device 102b is displaying two applications 306a and 306b (e.g., in the form of different graphical windows, panes, or portions of the user interface). The first application 306a includes a display element 304a, and the second application 306b includes a display element 304b. Similarly, user interface 110c of the computing device 102c is displaying two applications 306c and 306d (e.g., in the form of different graphical windows, panes, or portions of the user interface). The first application 306c includes a display element 304c, and the second application 306d includes a display element 304d.

In a similar manner as described with respect to FIGS. 2A-C, each display element 304a-d is graphically unique with respect to one another, and can be used to distinguish the computing devices 102b and 102c from one another, as well as the applications displayed by each of the devices. As described above, the graphically encoded display elements 304a-d can be presented in various ways. For example, one or more portions of the user interface 110b and 110c (e.g., icons, backgrounds, images, text, and/or other graphical elements) can be updated to include the display elements 304a-d.

In a similar manner as described with respect to FIGS. 2A-C, in some cases, the display elements 304a-d can be static. For example, the display elements 304a-d can each have a particular color, shape, and/or other graphical pattern, and different colors, shapes, and/or other graphical patterns can be used to distinguish the display elements from one another. In some cases, the display elements 304a-d can be dynamic, and its graphical properties can change over time. For example, each display element 304a-d can include one or more color channels of information (e.g., red, green, and blue), and the intensity of one or more of these color channels can vary over time according to a particular dynamic pattern (e.g., a sinusoid, a sequence of pulses, or other dynamic pattern). Different dynamic patterns can be used to distinguish the display elements from one another.

Similarly, although each of the display elements 304a-d are illustrated using different shading patterns, this is merely to illustrate that each of the display elements 304a-d are graphically distinct from one another. In some cases, even though the display elements 304a-d each differ graphically from one another, each display element 304a-d can appear identical or substantially identical to a user (e.g., when viewed by an unaided human eye).

In this example, the user wishes to selectively transfer the data object 302 to the computing device 102b, such that it is made available to the application 306a. As shown in FIG. 3B, the user can make this selection by pointing the imaging component 106 of the computing device 102a in the direction of the computing device 102b (indicated by dotted line 308), such that the imaging component 106 acquires one or more images of the computing device 102b. In particular, the one or more images of the computing device 102b include the display element 304a presented by the display device 108b. As the display element 304a is unique with respect to the other display elements 304b-d, based on the acquired images, the computing device 102a can identify both the computing device 102b and the application 306a as the desired destination for the data transfer. For example, the computing device 102a can identify the display element 304a in the images, and compare it to a list of known display elements and their corresponding computing devices and/or applications; when a match is found, the computing device 102a can identify a particular one of the computing devices and applications as the intended destination. As described above, this list can be generated beforehand (e.g., during a "set up" process), or during the data transfer process.

In some cases, a list of known display elements and their corresponding computing devices and applications can be maintained on the computing device 102a. In these cases, the computing device 102a can identify, based on an acquired display element, both the destination computing device and the application. The computing device 102a can then transmit the data object to the destination computing device, and indicate the destination application to the destination computing device. In some cases, the computing device 102 can maintain the list based on feedback provided by each of the computing devices 102b-d (e.g., feedback identifying a particular application based on an identified display element).

In some cases, the computing device 102a can maintain a list of known display elements and their corresponding computing devices, but not the corresponding applications. Further, each of the computing devices 102b-d can maintain a list of their respective display elements and their corresponding applications. In these cases, the computing device 102a can identify, based on an acquired display element, the destination computing device. The computing device 102a can then transmit the data object to the destination computing device, and indicate the identified display element to the destination computing device. The destination computing device can then identify the destination application, and process the data object accordingly.

As shown in FIG. 3C, after identifying the computing device 102b and the application 306a, the computing device 102a transfers the selected data object 302 to the computing device 102b through the network 104 (indicated by line 310), and transmits an indication that the data object 302 is to be used with respect to application 306a. As a result of the transfer, the data object 302 is made available to the application 306a. This can include, for example, opening the data object 302 using the application 306a, incorporating the data object 302 into other data associated with the application 306a (e.g., inserting the data object 302 into a document displayed by the application 306a), or otherwise processing the data object 302 in accordance with the application 306a.

Although FIGS. 3A-C illustrate an example process of transferring a data object with respect to a particular application, this is merely an illustrative example. In practice, a similar process can be performed to transfer a data object with respect to a particular portion of a user interface. For example, different display elements can be displayed on different portions of a user interface; a computing device 102a can detect a particular display element, and transmit the data object to the appropriate destination computer, such that it is displayed, inserted, or otherwise processed with respect to the identified portion of the user interface.

Various techniques can be used to encode identifying information in the display elements.

In some cases, the display elements can be static, and the display elements can each have a particular color, shape, and/or other graphical pattern, and different colors, shapes, and/or other graphical patterns can be used to distinguish the display elements from one another. For instance, a display element can include one or more color channels of information (e.g., a red channel, a green channel, and a blue channel). The intensity of these color channels can vary, and these variations can be used to distinguish the display elements from one another.

Figure 4A:
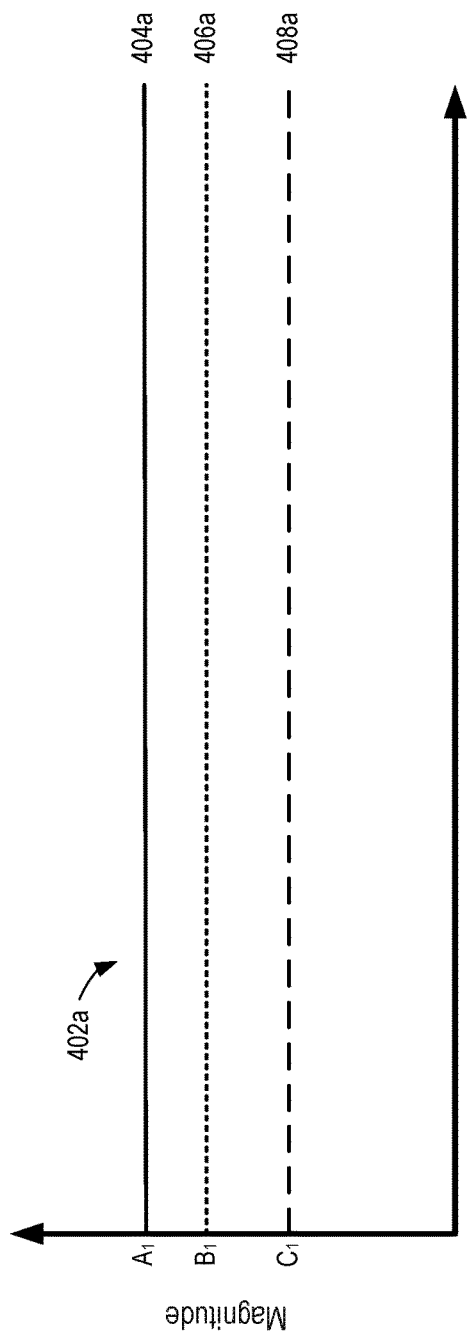
FIGS. 4A and 4B are graphs showing the color channels of example display elements over time.
Figure 4B:
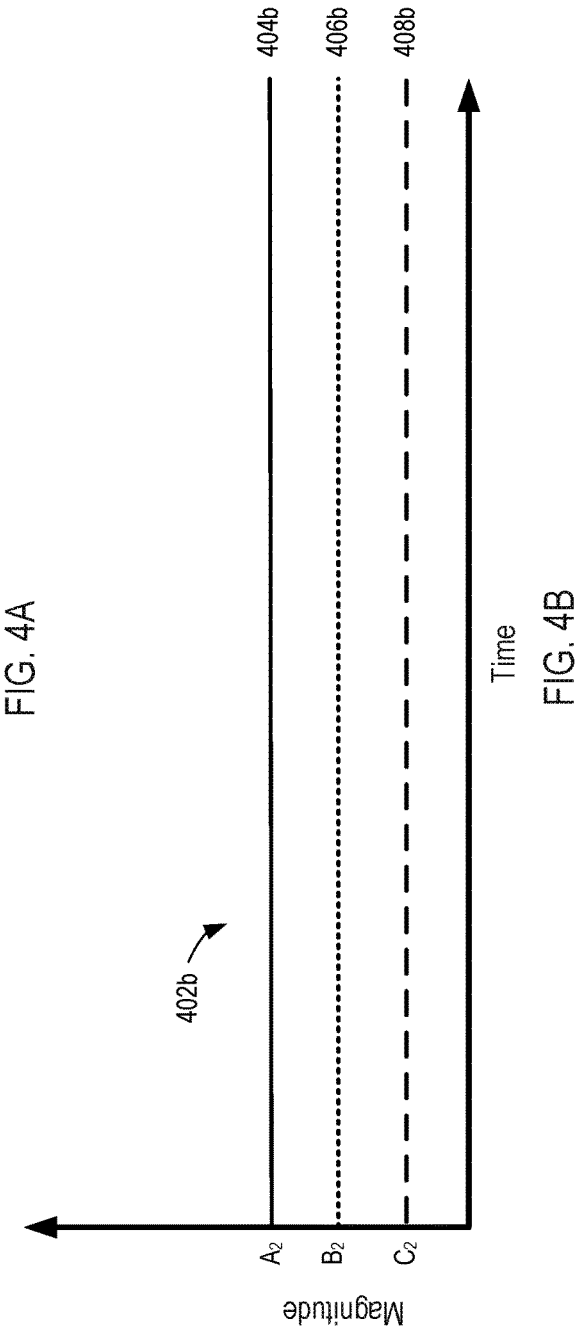

As an example, referring to FIGS. 4A and 4B, a first display element 402a can include color channels 404a, 406a, and 408a, and a second display element 402b can include color channels 404b, 406b, and 408b. In some cases, the color channels 404a-b can correspond to red color channels, the color channels 406a-b can correspond to blue color channels, and the color channels 408a-b can correspond to green color channels. In this example, the display elements 402a and 402b are static, and do not vary during the data transfer process.

The color channels of the display elements 402a and 402b can vary in intensity or magnitude to distinguish one display element from another. For example, for the display element 402a, the color channel 404a can have a magnitude $A_1$, the color channel 406a can have a magnitude $B_1$, and the color channel 408a can have a magnitude $C_1$. In contrast, for the display element 402b, the color channel 404b can have a magnitude $A_2$, the color channel 406b can have a magnitude $B_2$, and the third color channel 408b can have a magnitude $C_2$. Thus, a computing device can capture one or more images of a display element, identify the distinct graphical characteristics of that display element (e.g., the magnitudes of one or more color channels), and use those distinct graphical characteristics to identify a particular computing device and/or application as the destination of a data transfer.

In some cases, the display elements 204a-c can be dynamic, and its graphical properties can change over time. For instance, each display element can include one or more color channels of information (e.g., red, green, and blue), and the intensity of one or more of these color channels can vary over time according to a particular dynamic pattern (e.g., a sinusoidal wave, a sequence of pulses, or other dynamic pattern). Different dynamic patterns can be used to distinguish the display elements from one another.

In some cases, information can be phase encoded in the color channels of the display element. For instance, the intensities of the color channels of the display element can each oscillate at a particular frequency. One of the color channels acts as a carrier channel, while one or more other color channels act as signal channels. Information can be graphically encoded into the display element by varying the phase difference between each of the signal channels with respect to the carrier channel.

Figure 5A:
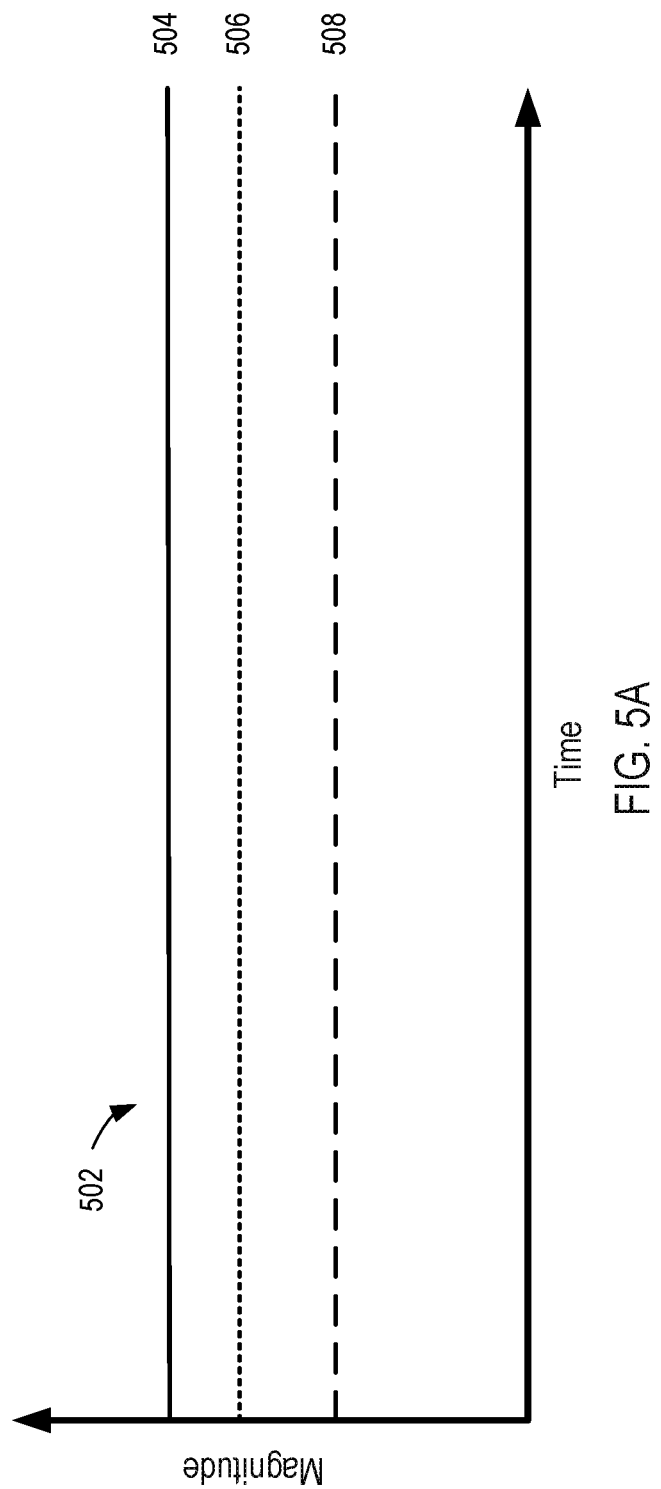

To illustrate, as shown in FIG. 5A, a display element 502 can include a color channel 504, a color channel 506, and a color channel 508. In some cases, the color channels 504, 506, and 508 can correspond to a red color channel, a blue color channel, and a green color channel, respectively. Here, the color channel 504 can act as a carrier channel, while the color channels 506 and 508 can act as signal channels. Information can be graphically encoded into the display element by varying the phase difference between the color channels 506 and 508 with respect to the color channel 504.

For example, referring to FIG. 5B, the color channels can each oscillate sinusoidally at a frequency f with an amplitude A (represented as display element 502a with color channels 504a, 506a, and 508a). In this example, the color channel 504a acts as a carrier channel, while the color channels 506a and 508a act as signal channels. Further, the color channels 506a and 508a each have the same (or substantially similar) phase as the color channel 504a.

Referring to FIG. 5C, a different display element can similarly include color channels that each oscillate sinusoidally at a frequency f with an amplitude A (represented as display element 502b with color channels 504b, 506b, and 508b). In this example, the color channel 504b similarly acts as a carrier channel, while the color channels 506b and 508b similarly act as signal channels. However, in this example, the color channel 506b differs in phase by 180° with respect to the color channel 504b, while the color channel 508b has the same (or substantially similar) phase as the color channel 504b.

Figure 5D:
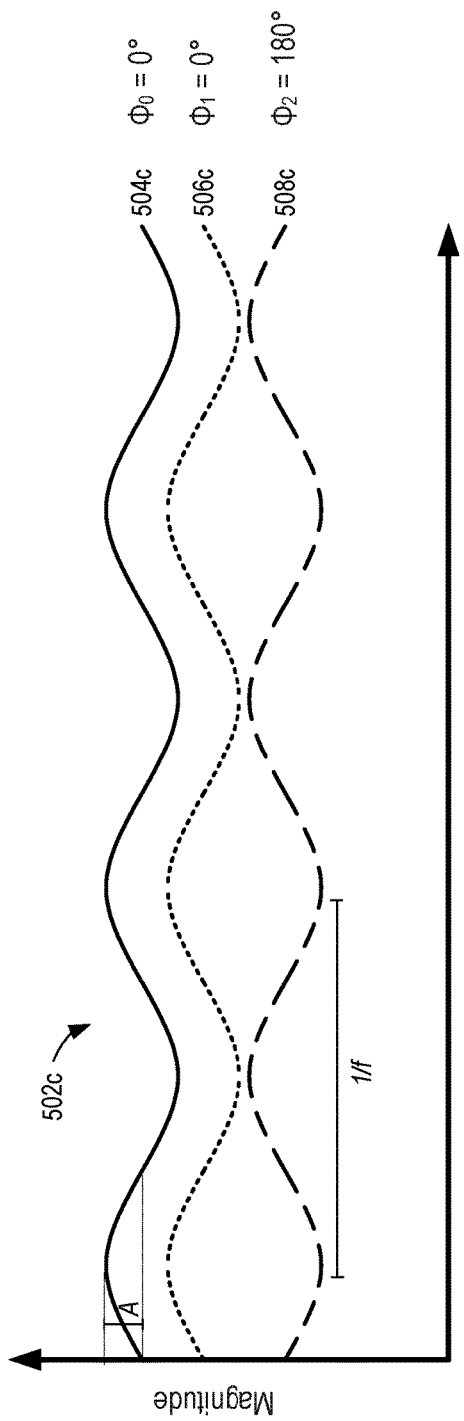

Referring to FIG. 5D, a different display element can similarly include color channels that each oscillate sinusoidally at a frequency f with an amplitude A (represented as display element 502c with color channels 504c, 506c, and 508c). In this example, the color channel 504b similarly acts as a carrier channel, while the color channels 506c and 508c similarly act as signal channels. However, in this example, the color channel 506c has the same (or substantially similar) phase as the color channel 504c, while the color channel 508c differs in phase by 180° with respect to the color channel 504c.

Figure 5E:
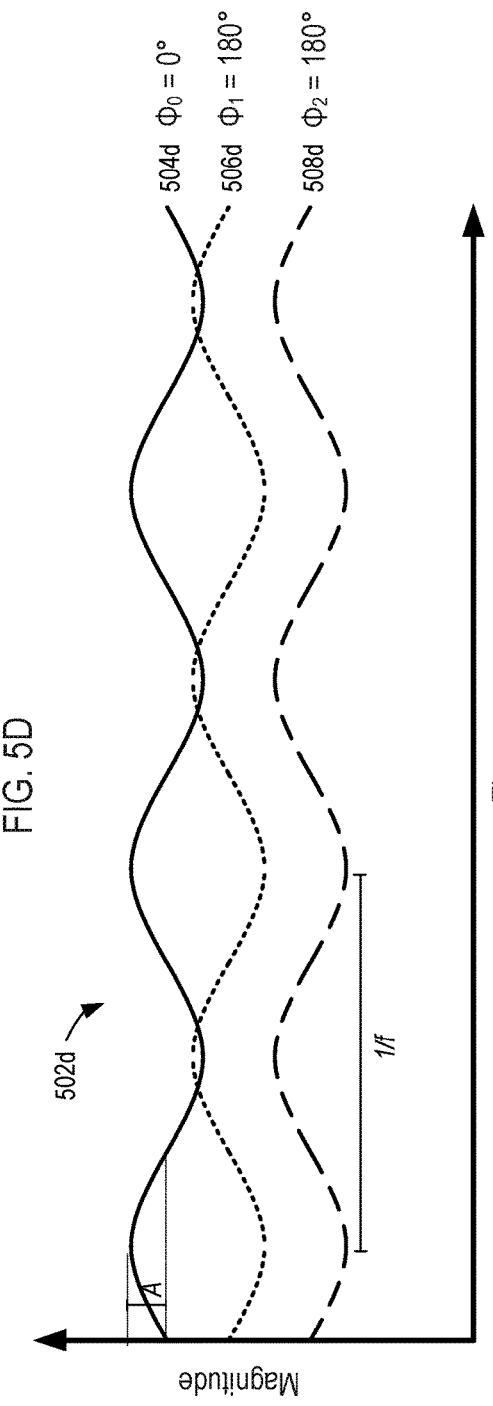

Referring to FIG. 5E, a different display element can similarly include color channels that each oscillate sinusoidally at a frequency f with an amplitude A (represented as display element 502d with color channels 504d, 506d, and 508d). In this example, the color channel 504b similarly acts as a carrier channel, while the color channels 506d and 508d similarly act as signal channels. However, in this example, the color channels 506d and 508d both differ in phase by 180° with respect to the color channel 504c.

Thus, the display element can be graphically encoded according to the table below. Using this example encoding technique, up to four different computing devices and/or applications can be distinguished from one another.

TABLE 1

Phase encoding table.

| Display Element No. | Signal Channel 1 (Phase) | Signal Channel 2 (Phase) |
|---|---|---|
| 1 | 0° | 0° |
| 2 | 180° | 0° |
| 3 | 0° | 180° |
| 4 | 180° | 180° |

To decode this information, the computing device acquires a sequence of images (e.g., a movie or video) of the display element. In some cases, the signal channels and carrier channels can be predefined, such that the same color channel (e.g., green) acts as the carrier channel, while the same color channels (e.g., blue and red) act as the signal channels between each use. Based on the captured images, the computing device determines the time-dependent variation of each color channel (e.g., a time-dependent waveform for each color channel). Using this information, the computing device determines the phase difference between the signal channels with respect to the carrier channel, and uses the phase differences to identify the display element from among several other display elements, and correspondingly, to identify a particular computing device and/or application as the destination for a data transfer.

In FIGS. 5B-E, each of the color channels are depicted as having a relatively large amplitude of oscillation A. However, this is merely to illustrate the oscillation. In some cases, even though the color channels oscillate, the oscillation can be sufficiently small, such that they cannot be discerned by a user, but still sufficiently large, such that they can be detected by the computing device 102a. This can be useful, for example, as the display elements can provide information regarding the identity of a computing device, while neither distracting the user, nor impairing the user's ability to see other information presented on the user interfaces 110b-d.

For example, referring to FIGS. 5B-E, the amplitude A can be selected such that the oscillation of the color channels can be detected by a computing device, but small enough so that the color channels do not appear to oscillate over time. This value for A can be, for example, a relatively small portion of the range of the color channel (e.g., 1/256, 3/256, 5/256, or some other fraction of the dynamic range of the color channel). As a result, a computing device can distinguish between each of the display elements shown in FIGS. 5B-E, but to a user, each of the display elements appear similar as the static display element shown in FIG. 5A. Other ranges are possible, depending on the implementation Similarly, the frequency f can be selected such that the oscillation of the color channels can be detected by a computing device, but small enough so that the color channels do not appear to oscillate over time. This value for f can be, for example between 25 Hz and 35 Hz (e.g., 30 Hz). Other frequency ranges are possible, depending on the implementation.

Although an example encoding technique is described above, this is merely an illustrative example. In practice, other encoding techniques can be used, depending on the implementation. For instance, in some cases, identity information can be encoded by varying the phase of signal channels with a finer degree of granularity with respect to the carrier channel; for example, the phase of the signal channels can be varied in 90° increments (e.g., 0°, 90°, 180°, and) 270°, 45° increments (e.g., 0°, 45°, 90°, 135°, 180°, 225°, 270°, and 315°), or in some other increment, in order to encode a greater amount of information in each signal channel. In some cases, identity information can be encoded in a smaller number of color channels (e.g., one or two), or a greater number of color channels (three, four, five, or more). Further, in some cases, a different color channel can be used as the carrier channel, and/or different color channel (s) can be used as the signal channels.

In some cases, information can be amplitude encoded in the color channels of the display element. For instance, the intensities of the color channels of the display element can each oscillate at a particular frequency. Information can be graphically encoded into the display element by varying the amplitudes of oscillation in that frequency.

To illustrate, referring to FIG. 6A, a display element 602 can include a color channel 604, a color channel 606, and a color channel 608. In some cases, the color channels 604, 606, and 608 can correspond to a red color channel, a blue color channel, and a green color channel, respectively. Information can be graphically encoded into the display element by varying the amplitude of oscillation of the color channels 604, 606, and 608 respective to the color channels of other display elements.

Referring to FIG. 6B, the color channels 604, 606, and 608 can each oscillate sinusoidally at a frequency f with an amplitude $A_1$, $A_2$, and $A_3$, respectively (represented as display element 602a with color channels 604a, 606a, and 608a). The amplitudes $A_1$, $A_2$, and $A_3$ can be varied to distinguish one display element from another.

For example, FIGS. 7A-D show different display elements in the frequency domain. As shown in FIG. 7A, a display element can be encoded such that the amplitudes of oscillation $A_1$, $A_2$, and $A_3$ are each relatively low (illustrated as display element 602b, with color channels 604b, 606b, and 608b). However, as shown in FIG. 7B, a second display element can be encoded such that the amplitude $A_1$ of one color channel is relatively larger than the amplitudes $A_2$ and $A_3$ of the other color channels (illustrated as display element 602c, with color channels 604c, 606c, and 608c). Similarly, as shown in FIG. 7C, a third display element can be encoded such that the amplitude $A_2$ of one color channel is relatively larger than the amplitudes $A_1$ and $A_3$ of the other color channels (illustrated as display element 602d, with color channels 604d, 606d and 608d). Likewise, as shown in FIG. 7D, a fourth display element can be encoded such that the amplitude $A_3$ of one color channel is relatively larger than the amplitudes $A_1$ and $A_2$ of the other color channels (illustrated as display element 602e, with color channels 604e, 606e, and 608e).

To decode this information, the computing device records a sequence of images (e.g., a movie or video) of the display element, and determines the amplitude of oscillation of the color channels at a particular frequency. In some cases, the frequency can be predefined, such that the same frequency is considered for each use. Using this information, the computing device identifies the display element from among several other display elements, and correspondingly, identifies a particular computing device and/or application as the destination for a data transfer.

Figure 7E:
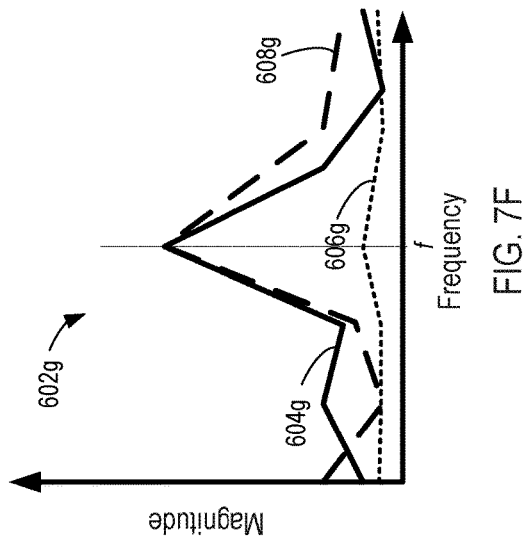
Figure 7F:
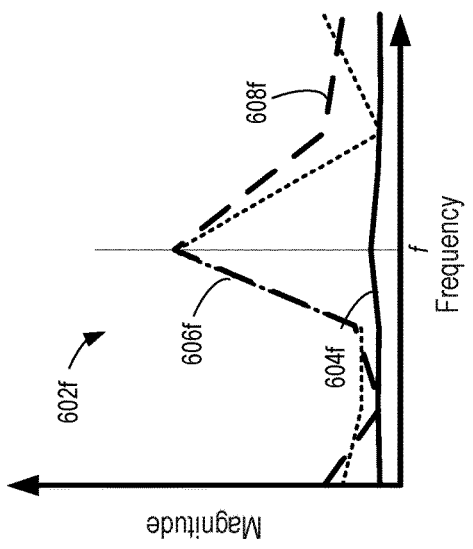
Figure 7G:
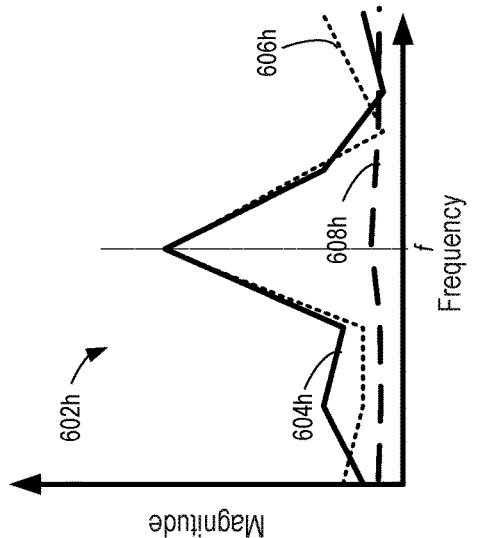

Although an example encoding technique is described above, this is merely an illustrative example. In practice, other encoding techniques can be used, depending on the implementation. For instance, in some cases, identity information can be encoded by varying the amplitude of oscillation of multiple different channels at once. For example, FIGS. 7E-G show additional display elements in the frequency domain. As shown in FIG. 7E, a display element can be encoded such that the amplitudes $A_2$ and $A_3$ of two color channels are relatively larger than the amplitude $A_1$ of the other color channel (illustrated as display element 602f, with color channels 604f, 606f, and 608f). Similarly, as shown in FIG. 7F, a display element can be encoded such that the amplitudes $A_1$ and $A_3$ of two color channels are relatively larger than the amplitude $A_2$ of the other color channel (illustrated as display element 602g, with color channels 604g, 606g, and 608g). Likewise, as shown in FIG. 7G, a display element can be encoded such that the amplitudes $A_1$ and $A_2$ of two color channels are relatively larger than the amplitude $A_3$ of the other color channel (illustrated as display element 602h, with color channels 604h, 606h, and 608h). Thus, additional information can be encoded into the display elements.

Further, in some cases, identity information can be encoded in a small number of color channels (e.g., one or two), or a greater number of color channels (three, four, five, or more).

In FIGS. 6B and 7A-G, some of the color channels are depicted as having a relatively large amplitude of oscillation. However, in a similar manner as described with FIGS. 5B-E, this is merely to illustrate the oscillation. In some cases, even though the color channels oscillate, the oscillation can be sufficiently small, such that they cannot be discerned by a user, but still sufficiently large, such that they can be detected by the computing device 102a. This can be useful, for example, as the display elements can provide information regarding the identity of a computing device, while neither distracting the user, nor impairing the user's ability to see other information presented on the user interfaces 110b-d.

For example, referring to FIGS. 7A-G, the amplitudes $A_1$, $A_2$, and $A_3$ can be selected such that the oscillation of the color channels can be detected by a computing device, but small enough so that the color channels do not appear to oscillate over time. These values for $A_1$, $A_2$, and $A_3$ can be, for example, the range of 1/256 to 5/256 of the dynamic range of each color channel. As a result, a computing device can distinguish between each of the display elements shown in FIGS. 7A-E, but to a user, each of the display elements appear similar as the static display element shown in FIG. 6A. Other ranges are possible, depending on the implementation.

Similarly, the frequency f can be selected such that the oscillation of the color channels can be detected by a computing device, but small enough so that the color channels do not appear to oscillate over time. This value for f can be, for example between 25 Hz and 35 Hz (e.g., 30 Hz). Other frequency ranges are possible, depending on the implementation. Although example encoding techniques are described above, these are merely illustrative examples. In some cases, other encoding techniques can be used either instead of or in addition to those described above. For example, in some cases, display elements can be encoded based on frequency difference between channels, or based on frequency modulation (e.g., pre-frequency modulation). Further, in some cases, display elements can be encoded using spreading codes (e.g., orthogonal spreading codes). In some cases, multiple different types of encoding techniques can be used to encode greater amounts of information in the display element.

Example Processes

Figure 8:
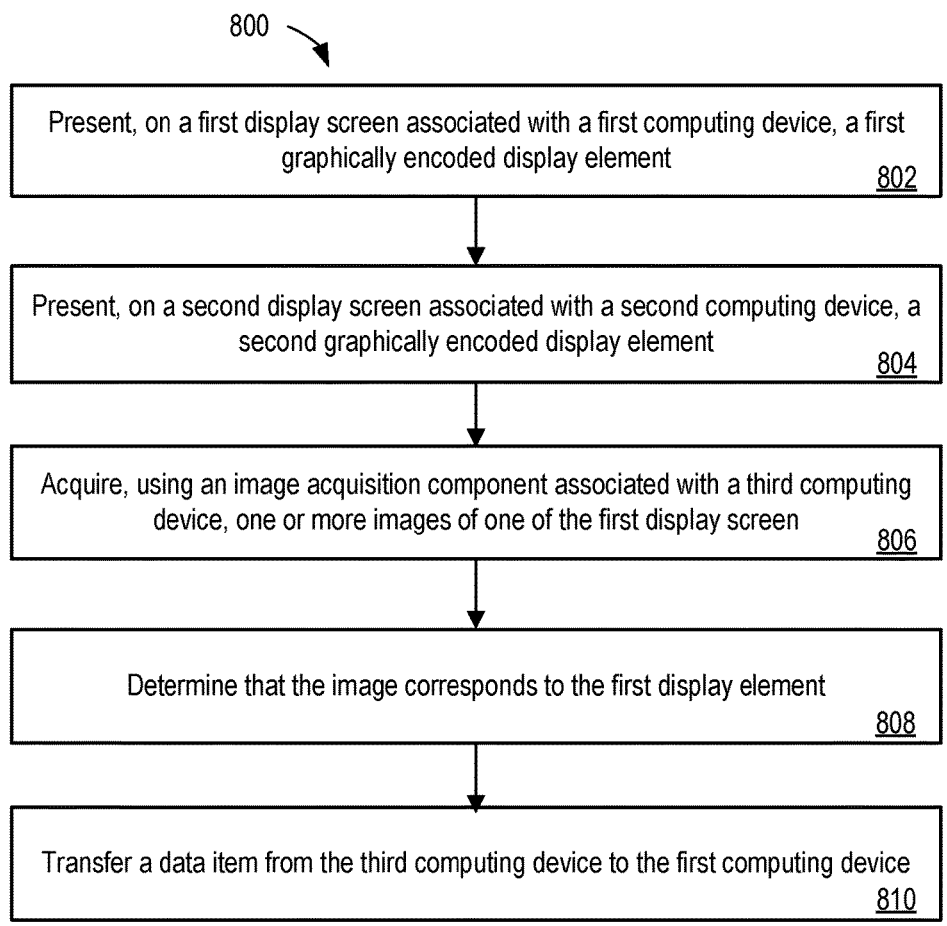
FIG. 8 is a flow diagram of an example process for transferring data between computing devices.

FIG. 8 is a flow diagram of an example process 800 for transferring data between computing devices. In some implementations, the process 800 can be implemented using, for example, the system 100 shown in FIG. 1 and/or the device architecture 1100 shown in FIG. 11.

The process 800 begins by presenting, on a first display screen associated with a first computing device, a first graphically encoded display element (step 802), and presenting, on a second display screen associated with a second computing device, a second graphically encoded display element (step 804). As described above, the first and second display elements can be graphically unique with respect to each other, and can uniquely correspond to the first computing device and the second computing device, respectively. Example implementations of these steps are shown and described, for example, with respect to FIGS. 2A and 3A.

After the first and second display elements are presented by the first and second computing devices, a third computing device acquires one or more images of the first display screen (step 806). As described above the third computing device can include an imaging component for acquiring digital images of the surrounding environment. Digital images can include, for example, one or more static images (e.g., photographs), or one or more sequences of images (e.g., frames in a video or movie). Example implementations of these steps are shown and described, for example, with respect to FIGS. 2B and 3B.

After acquiring the one or more images, the third computing device determines that the image corresponds to the first display element displayed by the first computing device (step 808). In response, the third computing device transfers the data item from the third computing device to the first computing device (step 810). As described above, the third computing device can identify that the first display element has been captured in an image. As the first and second display elements are unique with respect to one another, based on the acquired images, the third computing device can identify the first computing device (corresponding to the first display element) as the desired destination for the data transfer. For example, the third computing device can identify the first display element in the images, and compare it to a list of known display elements and their corresponding computing devices; when a match is found, the third computing device can identify a particular one of the computing devices as the intended destination. In some cases, if there is more than one display element in an image, one of the display elements can be selected based on its location within the images (e.g., selecting the display element closest to the center of the image and/or within a particular pre-determined "target" area of the image), or the size of the display element (e.g., the largest display element); the selected display element can be processed as described above.

In some cases, the process 800 can also include receiving, at the third computing device, an indication from a user to share the data item. As described above, the first display element and the second display element can each be presented in response to receiving the indication from the user to share the data item. This indication can be, for example, one or more data packets or messages transmitted from the third computing device to the first and second computing devices, indicating that a data transmission is to occur.

In some cases, the process 800 can also include determining, based on the one or more images, that the first display element corresponds to a graphical user interface (GUI) of an application presented on the first display screen. Responsive to making this determination, the application can process the data item. For example, GUI of the application can be updated to include a representation of the data item.

In some cases, the process 800 can also include determining, based on the one or more images, that the first display element corresponds to a document presented on the first display screen. Responsive to making this determination, the data item can be inserted into the document.

In some cases, the first display element can include a first identifier encoded in one or more color channels of the first display element, and the second display element can include a second identifier encoded in one or more color channels of the second display element. As described above, in some implementations, the one or more color channels of the first display element can include a first sinusoidal signal and the one or more color channels of the second display element can include a second sinusoidal signal. In some cases, when viewed by a user (e.g., using an unaided human eye), the one or more color channels of the first display element and the one or more color channels of the second display element do not appear to vary according to time.

As described above, in some cases, the first identifier can be phase-encoded in two or more color channels of the first display element. For instance, the first identifier can be encoded by varying a phase of one color channel of the first display element with respect to another color channel of the first display element.

In some cases, the first identifier is encoded in three or more color channels of the first display element. The first identifier can be encoded by varying phases of two color channels of the first display element with respect to another color channel of the first display element.

In some cases, the color channels of the first display element can include a carrier channel, a first signal channel, and a second signal channel, each having a same frequency. The first identifier can be phase-encoded by varying the phases of the first signal channel and the second signal channel with respect to the carrier channel. The carrier channel, the first signal channel, and the second signal channel can each be one of a green color channel, a blue color channel, and a red color channel.

In some cases, transferring the data item from the third computing device to the first computing device can include transferring the data item over a wireless connection. The wireless connection can be, for example, a Bluetooth connection over a Bluetooth network, or a Wi-Fi connection over a W-Fi network.

Although FIG. 8 depicts a process involving three computing devices, this is merely an illustrative example. In practice, two or more computing devices can be used. For example, in some cases, a first computing system can display a first graphically encoded display element on a first display screen, and a second computing device can acquire one or more images of the first display screen using an image acquisition component. The second computing device can determine that the image correspond to the first display element, and in response, transfer a data item to the first computing device. As another example, in some cases, three of more computing systems can each display respective graphically encoded display elements on respective display screens. A source computing device can acquire one or more images of the one of the display screens using an image acquisition component. The source computing device can determine that the image correspond to a particular one of the display element, and in response, transfer a data item to the corresponding computing device.

Figure 9:
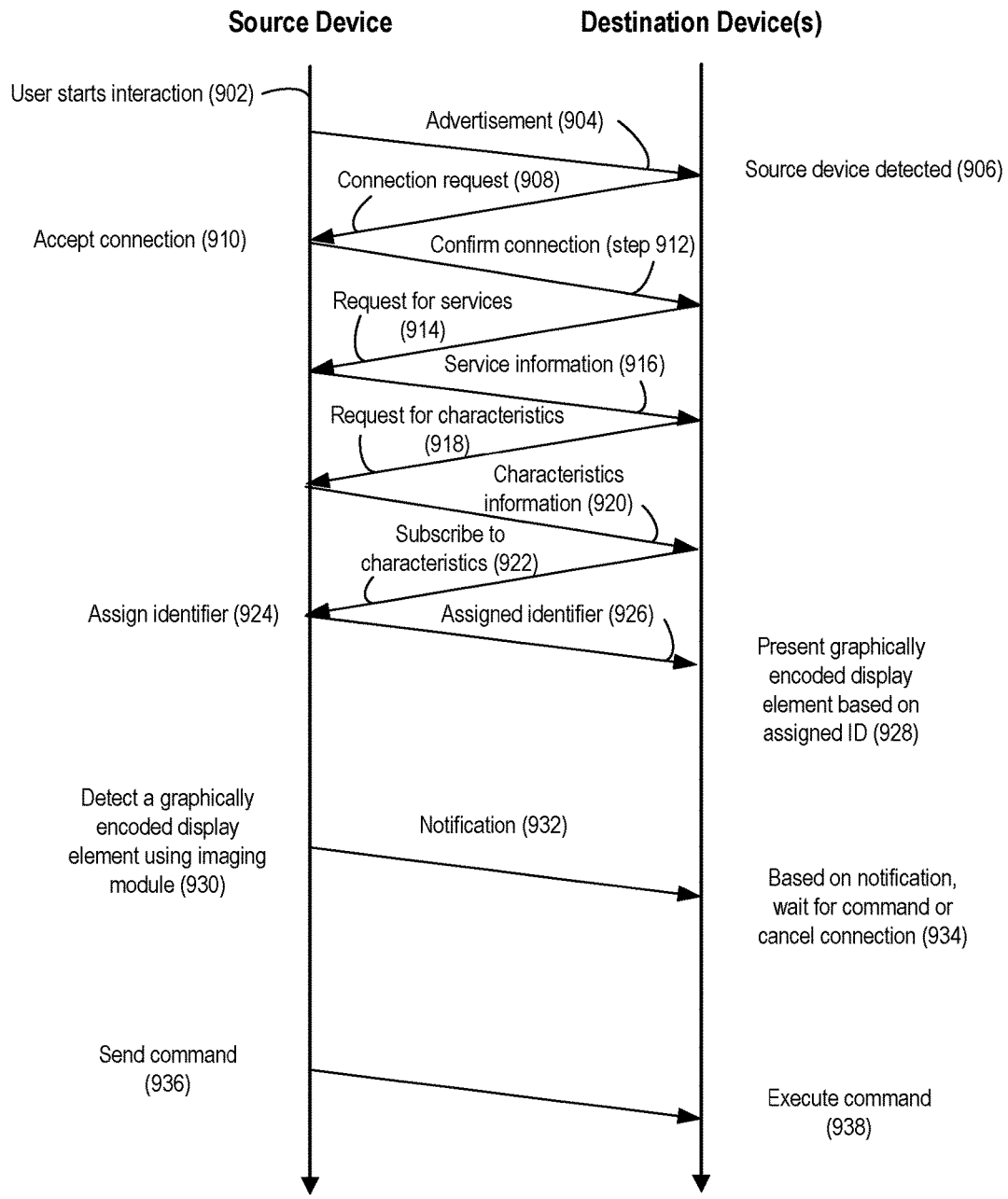
FIG. 9 is a flow diagram of another example process for transfer data between computing devices.

FIG. 9 is a flow diagram of another example process 900 for transferring data between computing devices. In some implementations, the process 900 can be implemented using, for example, the system 100 shown in FIG. 1 and/or the device architecture 1100 shown in FIG. 11.

The process 900 begins by presenting, with the user starting an interaction with the source device. As an example, a user can interact with a computing device (e.g., the computing device 102*a*), indicating that he wishes to share data stored on the computing device with another computing devices (e.g., one or more of computing devices 102*b-d*).

In response, the source device transmits a notification to each destination device that advertises the availability of the source device for data transfer (step 904). In some cases, this notification can be transmitted in accordance with a wireless standard (e.g., a Bluetooth low energy, BLE, advertisement sent over a Bluetooth network).

In response, one or more of the destination devices receives the advertisement, and detects the presence of the source device (step 906). In some cases, each of the destination devices can monitor particular communications channels (e.g., particular frequency bands associated with Bluetooth communications) to determine whether an advertisement has been sent over those communications channels.

In response, each of the destination devices that detects the source device transmits a connection request to the source device (step 908). The source device accepts the connection (step 910), and transmits a connection information to the appropriate destination device (step 912). In some cases, each of the destination devices can first determine whether the source device is in relatively close proximity before sending a connection request. For example, each of the destination devices can determine the signal strength of the advertisement from the source device (e.g., a received signal strength indicator, RSSI, of the advertisement), and transmit a connection request only if the signal strength of the advertisement meets or exceeds a particular threshold value.

After a connection is established, each destination device can transmit a request for service information to the source device (step 914). Information regarding the source device's services is transmitted in response (step 916). Services can include, for example, services that are available through a communications standard. For example, in case of Bluetooth, this can include heart rate, health thermometer, location and navigation, etc. Services can include, for example, proprietary or non-standard services. For example, this can include information related to the transfer to data items using the implementations described herein (e.g., information pertaining to a "visual interaction service," including information relating to the identification of destination computing device, applications, portions of a user interface, or other such information).

Further, each destination device can also transmit a request for the characteristics of the source device (step 918). Information regarding the source device's characteristics is transmitted in response (step 920). Based on this information, the destination devices each subscribe to the characteristic of the source device (step 922). Characteristics can include, for example variables, commands, and other settings that allow the source device and destination device to communicate with each other in a consistent manner.

In response, the source device assigns an identifier to each destination device (step 924), and transmits the assigned identifier to each destination device (step 926). In some cases, the identifiers can be a sequence of alphanumeric characters, or other information that uniquely identifies each of the destination devices with respect to one another.

Upon receiving an assigned identifier, each destination device presents a graphically encoded display element based on the assigned identifier (step 928). As described above, each display element is graphically unique with respect to the other display elements, and uniquely corresponds to a particular one of the destination devices. Thus, the display elements can be used by the source device as a graphical identifier to distinguish the destination devices from one another. As described above, the display elements can be presented in various ways. For example, one or more portions of the user interface of the destination devices (e.g., icons, backgrounds, images, text, and/or other graphical elements) can be updated to include the display elements.

The source device subsequently detects one of the graphically encoded display elements using an imaging component (step 930), and notifies each of the destination devices whether they were selected (step 932). As described above, a user wishing to selectively transfer data to one of the destination devices, while not transferring the data to the other destination devices, can make this selection by pointing the imaging component of the source device in the direction of one of the destination devices, such that the imaging component acquires one or more images of the destination device. In particular, the one or more images of the destination device include the display element presented by the destination device. As that display element is unique with respect to the other display elements, based on the acquired images, the source device can identify the destination device as the desired destination for the data transfer. As an example, the source device can identify the display element in the images, and compare it to a list of known display elements and their corresponding destination devices; when a match is found, the source device can identify a particular one of the destination devices as the intended destination. In some cases, the notification can be data that indicates, to each destination device, whether that destination device's display element was detected by the source device, and correspondingly, whether that destination device was selected as the intended destination of the data transfer.

In response to receiving the notification, each destination device either waits for a command from the source device (if that destination device was selected), or cancels the connection to the source device (if that destination device was not selected) (step 934).

The source device subsequently transmits a command to the selected destination device (step 936), and the selected destination device executes the command (step 938). As described above, the command could be, for example, an instruction to receive a particular data object over a network connection (e.g., a document, image, movie, music, and/or file transmitted by the source device). In some cases, the command could be an instruction to open a data object using a particular application, incorporate a data object into other data associated with a particular application (e.g., insert a data object into a document displayed by that application), or otherwise process a data object in accordance with a particular application. In some cases, the command could be an instruction to place a data object at a particular position on a user interface. In some cases, the command could be an instruction to display additional display elements (e.g., additional display elements in a grid or other arrangement) to allow for precise positioning of a data object with respect to the user interface of the destination device.

Example Systems

Figure 10A:
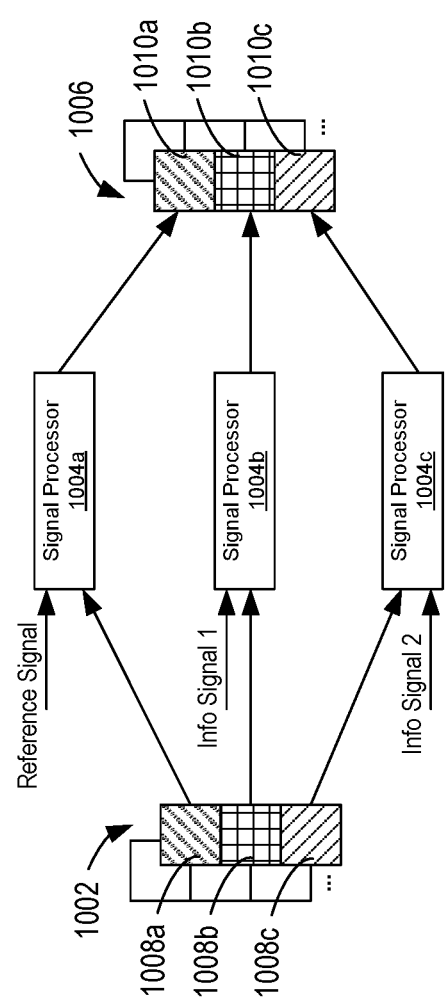
FIG. 10A is a diagram of an example system for encoding information.

An example system 1000 for graphically encoding display elements is shown schematically in FIG. 10A. The system 1000 includes several image pixels 1002, several signal processors 1004a-c, and several display image pixels 1006.

Each image pixel 1002 includes one or more subpixels 1008a-c. In some cases, each subpixel can correspond to a different color channel of that pixel. For example, each image pixel 1002 can include a first subpixel corresponding to a red color channel, a second subpixel corresponding to a blue color channel, and a third subpixel corresponding to a green color channel. One or more pixels 1002 can be used to present a graphically encoded display element on a device, as described herein.

Each subpixel 1008a-c is coupled to a respective signal processor 1004a-c. The signal processors 1004a-c encode the signals of the subpixel 1008a-c by introducing additional information into each subpixel signal. For example, as described above, information can be phase encoded in the color channels of the display element. This can be performed by introducing a reference or carrier signal (e.g., a sinusoidal signal oscillating at a particular frequency) to a first subpixel 1008a, resulting in a display subpixel 1010a; the resulting subpixel 1010a can be presented as a part of the carrier color channel of a display element, as described above. Further, information signals can be introduced into the subpixels 1008b and 1008c (e.g., sinusoidal signal oscillating at the same frequency as the reference or carrier signal, but phase shifted or phase aligned with the reference signal); the resulting subpixels 1010b and 1010c can be presented as a part of the signal channels of a display element, as described above. One or more pixels 1006 can be encoded and presented in this manner to present the graphically encoded display elements, as described above.

In some cases, the signal processors 1004*a-c* can additively combine the signals from a respective subpixel 1008*a* with additional information (e.g., a reference signal or an information signal). In some implementations, the signal processors 1004*a-c* can offset the resulting signals to avoid clipping or clamping. For example, in some cases, each subpixel 1010*a-c* can be limited to a particular range of values (e.g., 0-3, 0-15, 0-255, or some other range of values). If adding a signal from a subpixel 1008*a-c* with a reference or information signal would cause the resulting signal to depart from the range (e.g., exceed the upper limit or fall below the lower limit), the signal processors 102*a-c* can offset the signal of the subpixel 1008*a-c* by a particular value, such that the signal of the subpixel 1008*a-c* is able to fully oscillate within the range.

Although individual components are depicted in FIG. 10A, this is merely an illustrative example. In practice, each component can be implemented by an individual component or device, or several components can be implemented by a single component or device.

Figure 10B:
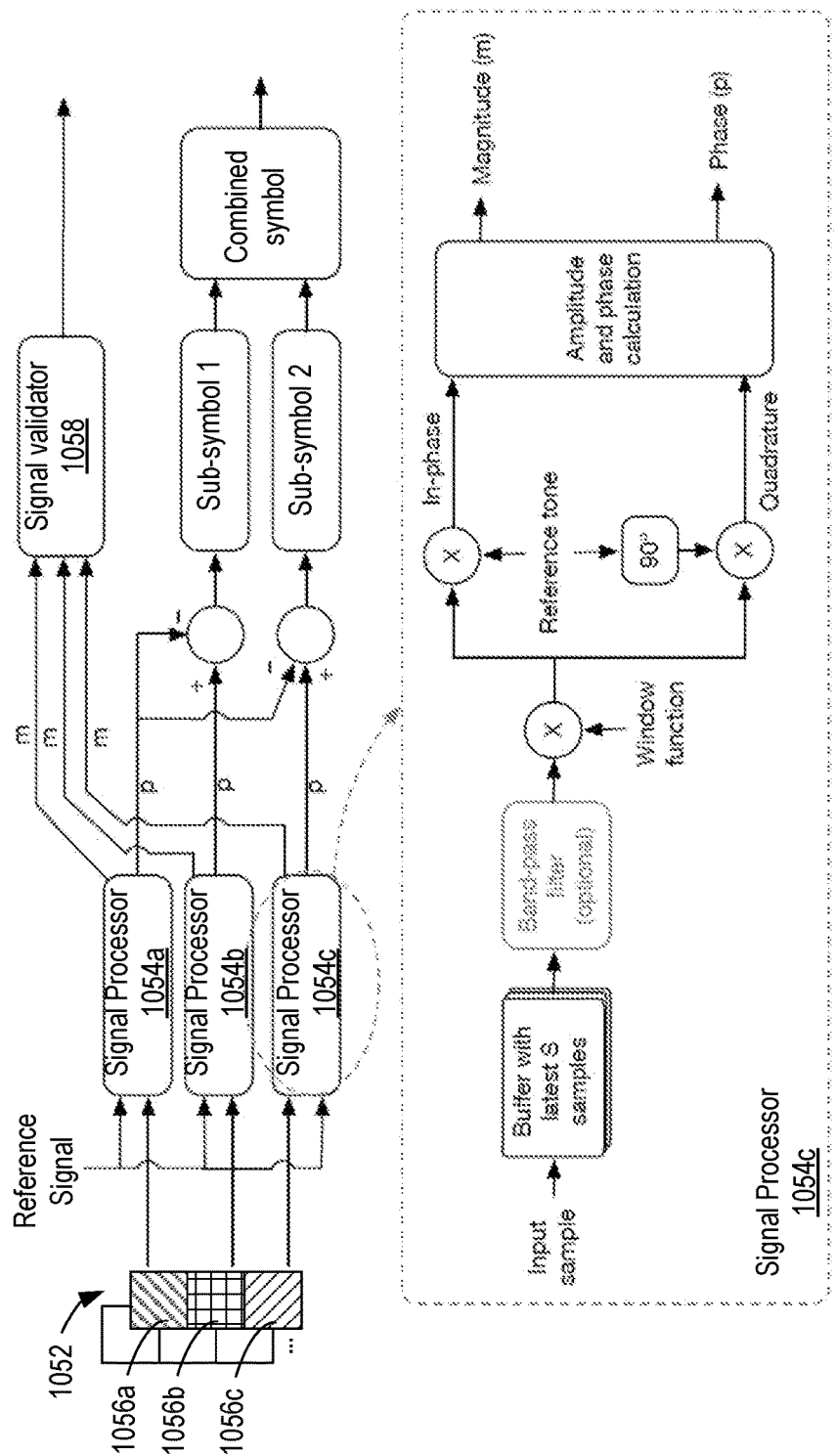
FIG. 10B is a diagram of an example system for decoding information.

An example system 1050 for decoding display elements is shown schematically in FIG. 10B. The system 1050 includes several image pixels 1052, and several signal processors 1054*a-c*.

Each image pixel 1052 includes one or more subpixels 1056*a-c*. In some cases, each subpixel can correspond to a different color channel of a pixel of an imaging sensor (e.g., a CCD sensor). For example, each image pixel 1052 can include a first subpixel corresponding to a red color channel, a second subpixel corresponding to a blue color channel, and a third subpixel corresponding to a green color channel. One or more pixels 1052 can be used to represent an image containing a graphically encoded display element, as described herein.

Each subpixel 1056*a-c* is coupled to a respective signal processor 1054*a-c*. The signal processors 1054*a-c* decode the signals of the subpixel 1056*a-c* by extracting identification information encoded in the subpixel signals. For example, as described above, identifying information can be phase encoded in the color channels of the display element, and the signal processors 1054*a-c* can extract the identification information through phase decoding. This can be performed by comparing the signals from each of the subpixels 1056*a-c* against a reference signal (e.g., a sinusoidal signal oscillating at a particular frequency) to determine respective phase differences p. As described above, one of the subpixels (e.g., subpixel 1056*a*) can correspond to a carrier color channel and the other subpixels (e.g., subpixels 1056*b* and 1056*c*) can correspond to signal color channels. Accordingly, the phase difference p of that subpixel 1056*a* can be compared to the phase differences p of the other two subpixels 1056*b-c* to determine a respective sub-symbol for each signal color channel. As an example, as described with respect to Table 1, the signal channels can be varied in 180° increments with respect to the carrier reference channel; thus, in these cases, each signal color channel provides one binary bit of information.

Further, the signal processors 1054*a-c* can determine a magnitude of oscillation m for each subpixel 1056*a-c*. This information can be used by a signal validator 1058 to validate the signals obtained from the signal processors 1054*a-c*. For example, in some cases, the signal validator 1058 determines that the signals are valid when the magnitude of oscillation m of the signals exceeds a particular threshold value, and/or falls within a particular range. This can be useful, for example, in identifying signals that are too weak to be accurately interpreted (e.g., signals having magnitudes of oscillation m that are too small), and/or identifying signals that do not correspond to encoded information (e.g., signals oscillating at magnitudes that deviate from an expected range).

In some cases, the system 1050 can decode identifying information based on several samples. For example, as shown in FIG. 10B, the signal processors 1054*a-c* can each buffer multiple different samples of the subpixels 1056*a-c* (e.g., corresponding to multiple different images or measurements by an imaging sensor). In some cases, the signal processors 1054*a-c* can each buffer a particular number of samples S; when the number of samples S is exceeded by an additional sample, the oldest sample can be discarded (e.g., a circular buffering technique). After a number of samples has been acquired (e.g., the number of samples S held in the buffer), the signal processors 1054*a-c* can apply a window function (e.g., having a window length S), such that the values of the window function are multiplied by the buffered input samples one by one. The resulting values are used to determine an in-phase component and quadrature component (i.e., 90° out-of-phase component) of the signal at the reference frequency. The magnitude m and phase p of the subpixel 1056*a-c* can be determined based on these components.

Although examples systems for encoding and decoding information are described in FIGS. 10A and 10B, these are merely examples. Other systems are also possible, depending on the implementations. For example, in some cases, a greater or smaller number of subpixels can be processed per pixel to encode a greater or smaller amount of information per pixel, respectively. Further, the phase of each signal channel can be varied in smaller increments in order to encode greater amount of information per pixel.

Although individual components are depicted in FIG. 10B, this is merely an illustrative example. In practice, each component can be implemented by an individual component or device, or several components can be implemented by a single component or device.

Example Device Architecture

Figure 11:
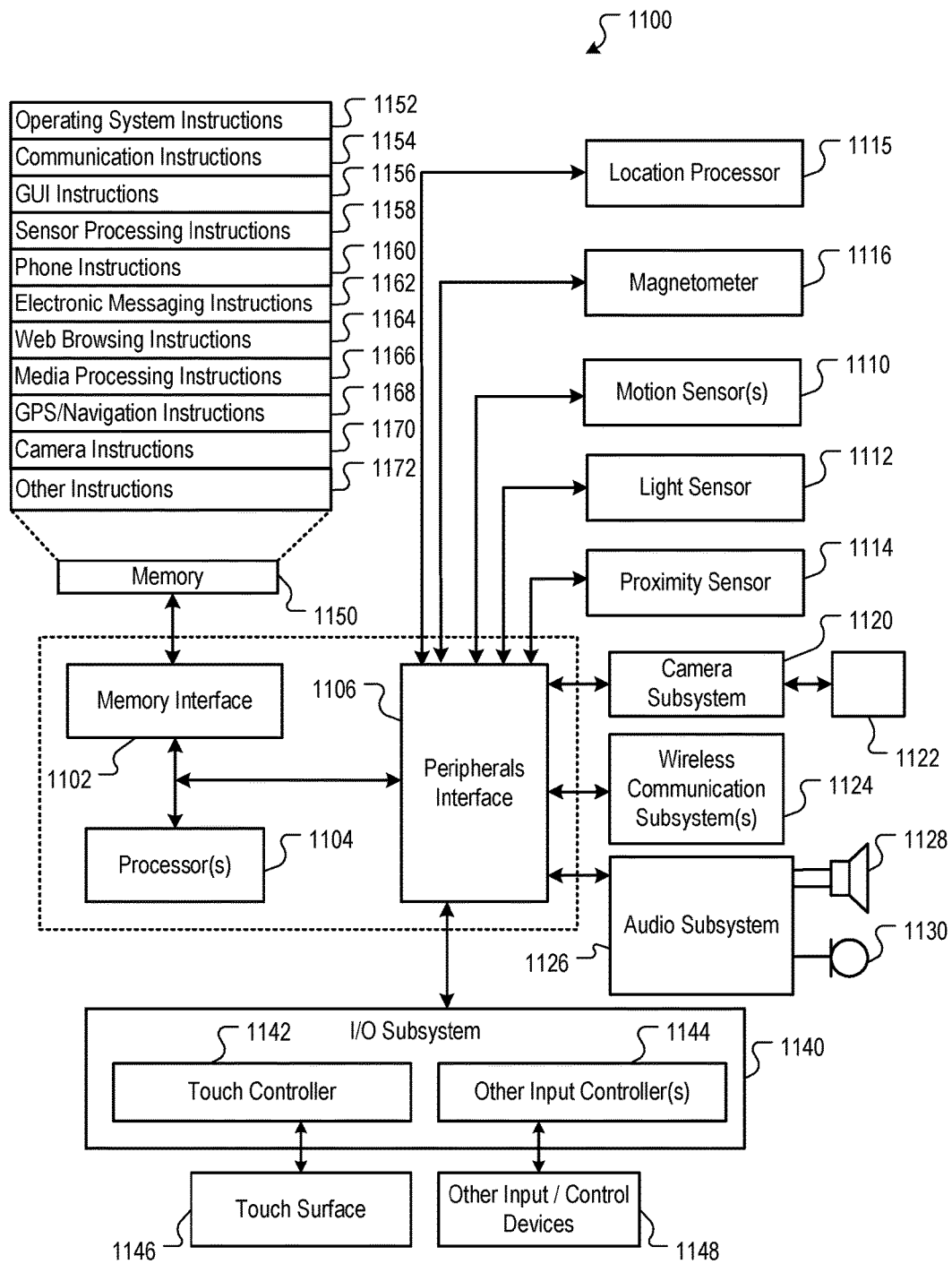
FIG. 11 is a block diagram of an example device architecture for implementing the features and processes described in reference to FIGS. 1-10.

FIG. 11 is a block diagram of an example device architecture 1100 for implementing the features and processes described in reference to FIGS. 1-10. Architecture 1100 may be implemented in any mobile device for generating the features described in reference to FIGS. 1-10, including but not limited to desktop computers, portable computers, smart phones, tablet computers, game consoles, wearable computers, set top boxes, media players, smart TVs, and the like. Architecture 1100 may include memory interface 1102, data processor(s), image processor(s) or central processing unit (s) 1104, and peripherals interface 1106. Memory interface 1102, processor(s) 1104 or peripherals interface 1106 may be separate components or may be integrated in one or more integrated circuits. One or more communication buses or signal lines may couple the various components.

Sensors, devices, and subsystems may be coupled to peripherals interface 1106 to facilitate multiple functionalities. For example, motion sensor 1110, light sensor 1112, and proximity sensor 1114 may be coupled to peripherals interface 1106 to facilitate orientation, lighting, and proximity functions of the device. For example, in some implementations, light sensor 1112 may be utilized to facilitate adjusting the brightness of touch surface 1146. In some implementations, motion sensor 1110 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 1106, such as a temperature sensor, a biometric sensor, or other sensing device, to facilitate related functionalities.

Location processor 1115 (e.g., GNSS receiver chip) may be connected to peripherals interface 1106 to provide geo-referencing. Electronic magnetometer 1116 (e.g., an integrated circuit chip) may also be connected to peripherals interface 1106 to provide data that may be used to determine the direction of magnetic North. Thus, electronic magnetometer 1116 may be used as an electronic compass.

Camera subsystem 1120 and an optical sensor 1122, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 1124. Communication subsystem(s) 1124 may include one or more wireless communication subsystems. Wireless communication subsystems 1124 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 1124 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. Wireless communication subsystems 1024 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 1126 may be coupled to a speaker 1128 and one or more microphones 1130 to facilitate voice-enabled functions, such as voice recognition, voice replication, digital recording, and telephony functions.

I/O subsystem 1140 may include touch controller 1142 and/or other input controller(s) 1144. Touch controller 1142 may be coupled to a touch surface 1146. Touch surface 1146 and touch controller 1142 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 1146. In one implementation, touch surface 1146 may display virtual or soft buttons and a virtual keyboard, which may be used as an input/output device by the user.

Other input controller(s) 1144 may be coupled to other input/control devices 1148, such as one or more buttons, rocker switches, thumb-wheel, infrared port, USB port, and/or a pointer device such as a stylus. The one or more buttons (not shown) may include an up/down button for volume control of speaker 1128 and/or microphone 1130.

In some implementations, device architecture 1100 may present recorded audio and/or video files, such as MP3, AAC, and MPEG video files. In some implementations, device 1000 may include the functionality of an MP3 player and may include a pin connector for tethering to other devices. Other input/output and control devices may be used.

Memory interface 1102 may be coupled to memory 1150. Memory 1150 may include high-speed random access memory or non-volatile memory, such as one or more magnetic disk storage devices, one or more optical storage devices, or flash memory (e.g., NAND, NOR). Memory 1150 may store operating system 1152, such as Darwin, RTXC, LINUX, UNIX, OS X, WINDOWS, or an embedded operating system such as VxWorks. Operating system 1152 may include instructions for handling basic system services and for performing hardware dependent tasks. In some implementations, operating system 1152 may include a kernel (e.g., UNIX kernel).

Memory 1150 may also store communication instructions 1154 to facilitate communicating with one or more additional devices, one or more computers or servers, including peer-to-peer communications. Communication instructions 1154 may also be used to select an operational mode or communication medium for use by the device, based on a geographic location (obtained by the GPS/Navigation instructions 1168) of the device. Memory 1150 may include graphical user interface instructions 1056 to facilitate graphic user interface processing, including a touch model for interpreting touch inputs and gestures; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GPS/Navigation instructions 1168 to facilitate GPS and navigation-related processes; camera instructions 1170 to facilitate camera-related processes and functions; and other instructions 1172 for performing some or all of the processes, as described in reference to FIGS. 1-10.

Each of the above identified instructions and applications may correspond to a set of instructions for performing one or more functions described above. These instructions need not be implemented as separate software programs, procedures, or modules. Memory 1150 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   presenting, on a first display screen associated with a first computing device, a first graphically encoded display element;
   presenting, on a second display screen associated with a second computing device, a second graphically encoded display element different than the first graphically encoded display element, wherein the first graphically encoded display element and the second graphically encoded display element are each presented in response to receiving, through a third computer device, an indication from a user to share a data item stored on the third computer device;
   acquiring, using an image acquisition component associated with the third computing device, one or more images of the first display screen;
   determining that the one or more images correspond to the first graphically encoded display element; and
   responsive to determining that the one or more images correspond to the first graphically encoded display element, transferring the data item from the third computing device to the first computing device.

2. The method of claim 1, further comprising:
   determining, based on the one or more images, that the first graphically encoded display element corresponds to a graphical user interface (GUI) of an application presented on the first display screen, and
   responsive to determining that the first graphically encoded display element corresponds to the GUI of the application, updating the GUI of the application to include a representation of the data item.

3. The method of claim 1, further comprising:
   determining, based on the one or more images, that the first graphically encoded display element corresponds to a document presented on the first display screen, and
   responsive to determining that the first graphically encoded display element corresponds to the document, inserting the data item into the document.

4. The method of claim 1, wherein determining that the one or more images correspond to the first graphically encoded display element comprises distinguishing the first graphically encoded display element from the second graphically encoded display element.

5. The method of claim 4, wherein the first graphically encoded display element comprises a first identifier encoded in one or more color channels of the first graphically encoded display element, and wherein the second graphically encoded display element comprises a second identifier encoded in one or more color channels of the second graphically encoded display element.

6. The method of claim 5, wherein the one or more color channels of the first graphically encoded display element comprises a first sinusoidal signal and the one or more color channels of the second graphically encoded display element comprises a second sinusoidal signal.

7. The method of claim 6, wherein the one or more color channels of the first graphically encoded display element and the one or more color channels of the second graphically encoded display element, when viewed by an unaided human eye, do not appear to vary according to time.

8. The method of claim 6, wherein the first identifier is phase- encoded in two or more color channels of the first graphically encoded display element.

9. The method of claim 6, wherein the first identifier is encoded by varying a phase of one color channel of the first graphically encoded display element with respect to another color channel of the first graphically encoded display element.

10. The method of claim 6, wherein the first identifier is encoded in three or more color channels of the first graphically encoded display element, and wherein the first identifier is encoded by varying phases of two color channels of the first graphically encoded display element with respect to another color channel of the first graphically encoded display element.

11. The method of claim 6, wherein the color channels of the first graphically encoded display element comprise a carrier channel, a first signal channel, and a second signal channel, each having a same frequency, and
   wherein the first identifier is phase-encoded by varying phases of the first signal channel and the second signal channel with respect to the carrier channel.

12. The method of claim 11, wherein the carrier channel, the first signal channel, and the second signal channel are each in a group consisting of a green color channel, a blue color channel, and a red color channel.

13. The method of claim 1, wherein transferring the data item from the third computing device to the first computing device comprises transferring the data item over a wireless connection.

14. The method of claim 13, wherein the wireless connection is a short range wireless communication connection or a wireless local area network connection.

15. The method of claim 1, further comprising:
   presenting, on the first display screen:
      a first application, the first graphically encoded display element associated with the first application,
      a second application, and
      a third graphically encoded display element associated with the second application;
   determining, based on the one or more images, that the first graphically encoded display element corresponds to the first application; and
   responsive to determining that the one or more images correspond to the first graphically encoded display element and that the first graphically encoded display element corresponds to the first application, transferring a data item from the third computing device to the first computing device and providing the data item to the first application.

16. The method of claim 1, wherein the first graphically encoded display element and the second graphically encoded display element each varies according to time.

17. The method of claim 16, wherein the first graphically encoded display element varies according to one or more time-varying sinusoidal patterns.

18. The method of claim 16, wherein the first graphically encoded display element and the second graphically encoded display element, when viewed by an unaided human eye, do not appear to vary according to time.

19. The method of claim 1, further comprising:
receiving, at the third computer device from the user, a selection of the data item and a command to share the data item; and
in response to receiving the selection of the data item and the command to share the data item, transmitting the indication to each of the first computing device and the second computing device.

20. A non-transitory computer-readable medium including one or more sequences of instructions which, when executed by one or more processors, causes:
presenting, on a first display screen associated with a first computing device, a first graphically encoded display element;
presenting, on a second display screen associated with a second computing device, a second graphically encoded display element different than the first graphically encoded display element, wherein the first graphically encoded display element and the second graphically encoded display element are each presented in response to receiving, through a third computer device, an indication from a user to share a data item stored on the third computer device;
acquiring, using an image acquisition component associated with the third computing device, one or more images of the first display screen;
determining that the one or more images correspond to the first graphically encoded display element; and
responsive to determining that the one or more images correspond to the first graphically encoded display element, transferring the data item from the third computing device to the first computing device.

21. The non-transitory computer-readable medium of claim 20, wherein the one or more sequences of instructions, when executed by one or more processors, further causes:
determining, based on the one or more images, that the first graphically encoded display element corresponds to a graphical user interface (GUI) of an application presented on the first display screen, and
responsive to determining that the first graphically encoded display element corresponds to the GUI of the application, updating the GUI of the application to include a representation of the data item.

22. The non-transitory computer-readable medium of claim 20, wherein the one or more sequences of instructions, when executed by one or more processors, further causes:
determining, based on the one or more images, that the first graphically encoded display element corresponds to a document presented on the first display screen, and
responsive to determining that the first graphically encoded display element corresponds to the document, inserting the data item into the document.

23. The non-transitory computer-readable medium of claim 20, wherein determining that the one or more images correspond to the first graphically encoded display element comprises distinguishing the first graphically encoded display element from the second graphically encoded display element.

24. The non-transitory computer-readable medium of claim 23, wherein the first graphically encoded display element comprises a first identifier encoded in one or more color channels of the first graphically encoded display element, and wherein the second graphically encoded display element comprises a second identifier encoded in one or more color channels of the second graphically encoded display element.

25. The non-transitory computer-readable medium of claim 24, wherein the one or more color channels of the first graphically encoded display element comprises a first sinusoidal signal and the one or more color channels of the second graphically encoded display element comprises a second sinusoidal signal.

26. The non-transitory computer-readable medium of claim 25, wherein the one or more color channels of the first graphically encoded display element and the one or more color channels of the second graphically encoded display element, when viewed by an unaided human eye, do not appear to vary according to time.

27. The non-transitory computer-readable medium of claim 25, wherein the first identifier is phase-encoded in two or more color channels of the first graphically encoded display element.

28. The non-transitory computer-readable medium of claim 25, wherein the first identifier is encoded by varying a phase of one color channel of the first graphically encoded display element with respect to another color channel of the first graphically encoded display element.

29. The non-transitory computer-readable medium of claim 25, wherein the first identifier is encoded in three or more color channels of the first graphically encoded display element, and wherein the first identifier is encoded by varying phases of two color channels of the first graphically encoded display element with respect to another color channel of the first graphically encoded display element.

30. The non-transitory computer-readable medium of claim 25, wherein the color channels of the first graphically encoded display element comprise a carrier channel, a first signal channel, and a second signal channel, each having a same frequency, and
wherein the first identifier is phase-encoded by varying phases of the first signal channel and the second signal channel with respect to the carrier channel.

31. The non-transitory computer-readable medium of claim 30, wherein the carrier channel, the first signal channel, and the second signal channel are each in a group consisting of a green color channel, a blue color channel, and a red color channel.

32. The non-transitory computer-readable medium of claim 20, wherein transferring the data item from the third computing device to the first computing device comprises transferring the data item over a wireless connection.

33. The non-transitory computer-readable medium of claim 32, wherein the wireless connection is a short range wireless communication connection or a wireless local area network connection.

34. A system comprising:
a first computing device;
a second computing device; and
a third computing device,
wherein the first computing device is configured to present, on a first display screen associated with the first computing device, a first graphically encoded display element;
wherein the second computing device is configured to present, on a second display screen associated with the second computing device, a second graphically encoded display element;

wherein the first graphically encoded display element and the second graphically encoded display element are each presented in response to receiving, through a third computer device, an indication from a user to share a data item stored on the third computer device; and wherein the third computing device is configured to:
acquire, using an image acquisition component associated with the third computing device, one or more images of the first display screen;
determine that the one or more images correspond to the first graphically encoded display element; and
responsive to determining that the one or more images correspond to the first graphically encoded display element, transfer the data item from the third computing device to the first computing device.

35. The system of claim 34, wherein the third computing device is further configured to:
determine, based on the one or more images, that the first graphically encoded display element corresponds to a graphical user interface (GUI) of an application presented on the first display screen, and
responsive to determining that the first graphically encoded display element corresponds to the GUI of the application, cause the GUI of the application to be updated to include a representation of the data item.

36. The system of claim 34, wherein the third computing device is further configured to:
determine, based on the one or more images, that the first graphically encoded display element corresponds to a document presented on the first display screen, and
responsive to determining that the first graphically encoded display element corresponds to the document, cause the data item to be inserted into the document.

37. The system of claim 34, wherein determining that the one or more images correspond to the first graphically encoded display element comprises distinguishing the first graphically encoded display element from the second graphically encoded display element.

38. The system of claim 37, wherein the first graphically encoded display element comprises a first identifier encoded in one or more color channels of the first graphically encoded display element, and wherein the second graphically encoded display element comprises a second identifier encoded in one or more color channels of the second graphically encoded display element.

39. The system of claim 38, wherein the one or more color channels of the first graphically encoded display element comprises a first sinusoidal signal and the one or more color channels of the second graphically encoded display element comprises a second sinusoidal signal.

40. The system of claim 39, wherein the one or more color channels of the first graphically encoded display element and the one or more color channels of the second graphically encoded display element, when viewed by an unaided human eye, do not appear to vary according to time.

41. The system of claim 39, wherein the first identifier is phase-encoded in two or more color channels of the first graphically encoded display element.

42. The system of claim 39, wherein the first identifier is encoded by varying a phase of one color channel of the first graphically encoded display element with respect to another color channel of the first graphically encoded display element.

43. The system of claim 39, wherein the first identifier is encoded in three or more color channels of the first graphically encoded display element, and wherein the first identifier is encoded by varying phases of two color channels of the first graphically encoded display element with respect to another color channel of the first graphically encoded display element.

44. The system of claim 39, wherein the color channels of the first graphically encoded display element comprise a carrier channel, a first signal channel, and a second signal channel, each having a same frequency, and
wherein the first identifier is phase-encoded by varying phases of the first signal channel and the second signal channel with respect to the carrier channel.

45. The system of claim 44, wherein the carrier channel, the first signal channel, and the second signal channel are each in a group consisting of a green color channel, a blue color channel, and a red color channel.

46. The system of claim 34, wherein transferring the data item from the third computing device to the first computing device comprises transferring the data item over a wireless connection.

47. The system of claim 46, wherein the wireless connection is a short range wireless communication connection or a wireless local area network connection.

* * * * *